United States Patent
Richter et al.

(10) Patent No.: US 7,050,425 B2
(45) Date of Patent: *May 23, 2006

(54) APPARATUS FOR MULTIPLE MEDIA DIGITAL COMMUNICATION

(75) Inventors: Andreas Richter, Philadelphia, PA (US); Ogden Cartwright Reed, Jr., Philadelphia, PA (US)

(73) Assignees: BTG International Inc., West Conshohocken, PA (US); Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/874,782

(22) Filed: Jun. 22, 2004

(65) Prior Publication Data
US 2004/0228351 A1    Nov. 18, 2004

Related U.S. Application Data

(63) Continuation of application No. 10/804,776, filed on Mar. 19, 2004, which is a continuation of application No. 09/596,835, filed on Jun. 19, 2000, now Pat. No. 6,738,357, which is a continuation of application No. 09/437,269, filed on Nov. 10, 1999, now Pat. No. 6,104,706, which is a continuation of application No. 08/795,798, filed on Feb. 5, 1997, now Pat. No. 5,995,491, which is a continuation of application No. 08/626,580, filed on Apr. 2, 1996, now Pat. No. 5,623,490, which is a continuation of application No. 08/073,956, filed on Jun. 9, 1993, now abandoned.

(51) Int. Cl.
  *H04L 12/56* (2006.01)
(52) U.S. Cl. .................................... 370/352; 715/753

(58) Field of Classification Search ............... 370/263, 370/412, 352–356; 345/753; 715/753
See application file for complete search history.

(56) References Cited

U.S. PATENT DOCUMENTS

| | | |
|---|---|---|
| 3,584,142 A | 6/1971 | Schoeffler |
| 4,100,377 A | 7/1978 | Flanagan |
| 4,387,271 A | 6/1983 | Artom |
| 4,506,358 A | 3/1985 | Montgomery |
| 4,507,781 A | 3/1985 | Alvarez, III et al. |
| 4,516,156 A | 5/1985 | Fabris et al. ............... 358/85 |
| 4,525,779 A | 6/1985 | Davids et al. |

(Continued)

FOREIGN PATENT DOCUMENTS

CA         2080530       4/1994

(Continued)

OTHER PUBLICATIONS

Leung, Wu-Hon F., et al., "A Software Architecture for Workstations Supporting Multimedia Conferencing in Packet Switching Networks," IEEE Journal On Selected Areas in Communications, vol. 8, No. 3, pp. 380-390.

(Continued)

*Primary Examiner*—Melvin Marcelo
(74) *Attorney, Agent, or Firm*—Gazdzinski & Associates

(57) ABSTRACT

Apparatus for media communication in a communication system. In one embodiment, the apparatus comprises: a processor; and a routine running on the processor for negotiating with the remote processing machine a selection of at least one media type using a media type selection protocol that supports the description of a plurality of media types including audio, video and data, and to configure, according to the selection, the apparatus to process media data packets received from and to be transmitted to the remote processing machine over a packet switched network.

137 Claims, 16 Drawing Sheets

U.S. PATENT DOCUMENTS

| | | | |
|---|---|---|---|
| 4,574,374 A | 3/1986 | Scordo | |
| 4,627,052 A | 12/1986 | Hoare et al. | |
| 4,645,872 A | 2/1987 | Pressman et al. | |
| 4,650,929 A | 3/1987 | Boerger et al. | |
| 4,653,090 A | 3/1987 | Hayden | |
| 4,686,698 A | 8/1987 | Tompkins et al. | |
| 4,707,831 A | 11/1987 | Weir et al. | 370/94 |
| 4,710,917 A | 12/1987 | Tompkins et al. | |
| 4,734,765 A | 3/1988 | Okada et al. | |
| 4,748,620 A | 5/1988 | Adelmann et al. | |
| 4,756,019 A | 7/1988 | Szybicki | |
| 4,760,572 A | 7/1988 | Tomikawa | |
| 4,763,317 A | 8/1988 | Lehman et al. | 370/358 |
| 4,827,339 A | 5/1989 | Wada et al. | |
| 4,847,829 A | 7/1989 | Tompkins et al. | 370/62 |
| 4,849,811 A | 7/1989 | Kleinerman | |
| 4,882,743 A | 11/1989 | Mahmoud | |
| 4,888,795 A | 12/1989 | Ando et al. | |
| 4,893,326 A | 1/1990 | Duran et al. | |
| 4,897,866 A | 1/1990 | Majmudar et al. | |
| 4,905,231 A | 2/1990 | Leung et al. | |
| 4,918,718 A | 4/1990 | Emmons et al. | |
| 4,924,311 A | 5/1990 | Ohki et al. | |
| 4,932,047 A | 6/1990 | Emmons et al. | |
| 4,935,953 A | 6/1990 | Appel et al. | 379/53 |
| 4,937,856 A | 6/1990 | Natarajan | |
| 4,942,470 A | 7/1990 | Nishitani et al. | 358/160 |
| 4,942,540 A | 7/1990 | Black et al. | |
| 4,942,569 A | 7/1990 | Maeno | 370/60 |
| 4,943,994 A | 7/1990 | Ohtsuka et al. | |
| 4,945,410 A | 7/1990 | Walling | 358/141 |
| 4,949,169 A | 8/1990 | Lumeisky et al. | 358/86 |
| 4,953,159 A | 8/1990 | Hayden | |
| 4,953,196 A | 8/1990 | Ishikawa | |
| 4,962,521 A | 10/1990 | Komatsu et al. | |
| 4,965,819 A | 10/1990 | Kannes | |
| 4,991,169 A | 2/1991 | Davis et al. | 370/77 |
| 4,991,171 A | 2/1991 | Teraslinna et al. | |
| 4,995,071 A | 2/1991 | Weber et al. | 379/53 |
| 5,003,532 A | 3/1991 | Ashida et al. | |
| 5,014,267 A | 5/1991 | Tompkins et al. | 370/62 |
| 5,034,916 A | 7/1991 | Ordish | |
| 5,042,006 A | 8/1991 | Flohrer | |
| 5,042,062 A | 8/1991 | Lee et al. | |
| 5,046,079 A | 9/1991 | Hashimoto | |
| 5,046,080 A | 9/1991 | Lee et al. | |
| 5,056,136 A | 10/1991 | Smith | |
| 5,062,136 A | 10/1991 | Gattis et al. | |
| 5,072,442 A | 12/1991 | Todd | |
| 5,077,732 A | 12/1991 | Fischer et al. | |
| 5,079,627 A | 1/1992 | Filo | |
| 5,083,269 A | 1/1992 | Syobatake et al. | 370/85.6 X |
| 5,099,510 A | 3/1992 | Blinken, Jr. et al. | |
| 5,101,451 A | 3/1992 | Ash et al. | |
| 5,132,966 A | 7/1992 | Hayano et al. | 370/85.6 X |
| 5,136,581 A | 8/1992 | Muehrcke | |
| 5,140,584 A | 8/1992 | Suzuki | 370/85.6 X |
| 5,155,594 A | 10/1992 | Birnstein et al. | 358/136 |
| 5,157,662 A | 10/1992 | Tadamura et al. | |
| 5,177,604 A | 1/1993 | Martinez | 358/86 |
| 5,192,999 A | 3/1993 | Graczyk et al. | |
| 5,195,086 A | 3/1993 | Baumgartner et al. | 370/62 |
| 5,200,951 A | 4/1993 | Grau et al. | |
| 5,210,836 A | 5/1993 | Childers et al. | 395/375 |
| 5,220,653 A | 6/1993 | Miro | 395/275 |
| 5,231,492 A | 7/1993 | Dangi et al. | 358/143 |
| 5,241,625 A | 8/1993 | Epard et al. | |
| 5,243,596 A | 9/1993 | Port et al. | 370/60 X |
| 5,276,679 A | 1/1994 | McKay et al. | |
| 5,283,638 A | 2/1994 | Engberg et al. | |
| 5,291,492 A | 3/1994 | Andrews et al. | |
| 5,297,143 A | 3/1994 | Fridrich et al. | |
| 5,309,433 A | 5/1994 | Cidon et al. | 370/60 |
| 5,311,585 A | 5/1994 | Armstrong et al. | |
| 5,315,586 A | 5/1994 | Charvillat | |
| 5,323,445 A | 6/1994 | Nakatsuka | |
| 5,341,374 A | 8/1994 | Lewen et al. | |
| 5,355,371 A | 10/1994 | Auerbach et al. | |
| 5,371,534 A | 12/1994 | Dagdeviren et al. | |
| 5,373,549 A | 12/1994 | Bales et al. | |
| 5,375,068 A | 12/1994 | Palmer et al. | |
| 5,392,344 A | 2/1995 | Ash et al. | |
| 5,422,883 A | 6/1995 | Hauris et al. | |
| 5,432,525 A | 7/1995 | Maruo et al. | |
| 5,537,548 A | 7/1996 | Fin et al. | 395/200.04 |
| 5,594,859 A | 1/1997 | Palmer et al. | 395/330 |
| 5,623,490 A | 4/1997 | Richter et al. | |
| 5,995,491 A | 11/1999 | Richter et al. | |
| 6,104,706 A | 8/2000 | Richter et al. | |

FOREIGN PATENT DOCUMENTS

EP 0279232 A2 8/1988

OTHER PUBLICATIONS

Boudec, J. Y Le, "The Asynchronous Transfer Mode: A Tutorial," Computer Works and ISDN Systems, vol. 24, No. 4, (May 15, 1992), pp. 279-309.

Clifford J. Weinstein & James W. Forgie "Experience with Speech Communication in packet networks", IEEE Journal on Selected Areas in Communications, Special issue on *Packet switched voice and data communication*, 1(6), Dec. 1983.

D. Cohen "Specifications for the Network Voice Protocol", ISI/RR-75-39, USC/Information Sciences Institute (4676 Admiralty Way, Marina del Rey, CA 90292), Mar. 1976, Available from DTIC (AD #A023506).

RFC741 D. Cohen, "Specifications for the Network Voice Protocol NVP", RFC 741, No. 1977.

D. T. Magill, "Adaptive speech compression for packet communication systems", *Conference record of the IEEE National Telecommunications Conference*, pp. 29D-1-29D-5, 1973.

William L. Holbert "A layered Protocol for Packet Voice and data Integration" IEEE Journal on Selected Areas in Communications, Special issue on *Packet switched voice and data communication*, 1(6), Dec. 1983.

Giulo Barberis et al. "Coded Speech in Packet-switched Networks: Models and Experiments", IEEE Journal on Selected Areas in Communications, Special issue on *Packet switched voice and data communication*, 1(6), Dec. 1983.

Hiromi Ueda et al. "Evaluation of an Experimental Packetized Speech and Data Transmission System", IEEE Journal on Selected Areas in Communications, Special issue on *Packet switched voice and data communication*, 1(6), Dec. 1983.

Jeffrey M. Musser et al. "A Local Area Network as a Telephone Local Subscriber Loop", IEEE Journal on Selected Areas in Communications, Special issue on *Packet switched voice and data communication*, 1(6), Dec. 1983.

H. Schulzrine, "A Transport Protocol for Real Time Applications", Internet Draft, Dec. 15, 1992.

H. Schulzrine, "A Transport Protocol for Real Time Applications", Internet Draft, May 6, 1993.

Stephen Casner and Stephen Deering "First IETF Internet Audiocast" ACM SIGCOMM Computer Communication Review, vol. 22, No. 3, Jul. 1992.

Montgomery, W.A.: "Techniques for Packet Voice Synchronization", IEEE Journal on Selected Areas in Communications, vol. SAC-1, No. 6, Dec. 1983 (pp. 1022-1028).

"Adaptive Audio Playout Algorithm for Shared Packet Networks", IBM Technical Disclosure Bulletin, vol. 36, No. 4, Apr. 1993, Armonk, NY, US (pp. 255-257).

"A Packet-switched Multimedia Conferencing System" by Eve M. Schooler and Stephen L. Casner, Reprinted from the ACM SIGOIS Bulletin, vol. 1, No. 1, pp. 12-22 (Jan. 1989), University of Southern California, Information Sciences Institute, (12 pages).

"A Distributed Architecture for Multimedia Conference Control" by Eve M. Schooler, ISI Research Report, ISI/RR-91-289 (Nov. 1991), University of Southern California, Information Sciences Institute, (20 pages).

"An Architecture for Multimedia Connection Management" by Eve M. Schooler and Stephen L. Casner, Reprinted from the Proceedings IEEE 4$^{th}$ Comsoc International Workshop on Multimedia Communications, MM '92, pp. 271-274, Monterey, CA (Apr. 1992), Univeristy of Southern California, Information Sciences Institute, (6 pages).

"The Connection Control Protocol: Specification", Version 1.1, by Eve M. Schooler, USC/Information Sciences Institute, (Jan. 29, 1992), (pp. 1-29).

"The Connection Control Protocol: Architecture Overview", Version 1.0, by Eve M. Schooler, USC/Information Sciences Institute, (Jan. 28, 1992), (pp. 1-6).

"A Dual-Ring Lan for Integrated Voice/Video/Data Services" by Jon W. Mark and Byoung-Joon Lee, Dept. of Electrical and Computer Engineering, and Computer Communications Networks Group, Univ. of Waterloo, Ontario, Canada, (1990 IEEE) (pp. 850-857).

IBM Technical Disclosure Bulletin, vol. 32, No. 11, (Apr. 1990), Output Throttle Mechanism, (pp. 274-279), supplied by the British Library, www.bl.uk.

E. Brian Came "Modem Telecommunication" pp. 44-47 1984.

J. J. Degan et al., "Fast Packet Technology for Future Switches", AT&T Technical Journal, vol. 68, No. 2, Mar./Apr. 1989, pp. 36-50.

S. Nojima et al., "High Speed Packet Switching Network for Multi-Media Information", Proceedings of IEEE 1986 Computer Networking Symposium, pp. 141-150.

K. Yukimatsu et al., "Multicast Communication Facilities in a High Speed Packet Switching Network", Proceedings of ICCC'86, pp. 276-281.

E. Arthurs et al., "The Architecture of a Multicast Broadband Packet Switch", Proceedings of IEEE INFOCOM'88, pp. 1-8.

K. Y. Eng et al., "Multicast and Broadcast Services in a Knockout Packet Switch", Proceedings of IEEE INFOCOM'88, pp. 29-34.

J. S. Turner, "Design of a Broadcast Packet Switching Network", IEEE Trans. on Communications, vol. 36, No. 6, 1988, pp. 734-743.

W. H. Leung et al., "A Set of Operating System Mechanisms to Support Multi-Media Applications", Proceedings of 1988 International Zurich Seminar on Digital Communications, Mar. 1988, pp. B4.1-B4.6.

Glafoor et al., "An Efficient Communication Structure for Distributed Commit Protocols", IEEE Journal on Selected Areas in Communications, vol. 7, No. 3, Apr. 1989, pp. 375-389.

S. E. Minzer et al., "New Direction in Signaling for Broadband ISDN", IEEE Communications Magazine, Feb. 1989, pp. 6-14.

L. Aguitar et al. "Architecture for a Multimedia Teleconferencing System", Proceedings ACM SIGCOMM'86 Symposium, Aug. 1986, pp. 126-136.

S. R. Ahuja et al., "The Rapport Multimedia Conferencing System", Proceedings of Conference on Office Information Systems, Mar. 1988, pp. 1-8.

H. Forsdick, "Explorations into Real-Time Multimedia Conferencing", Proceedings of the 2nd International Symposium on Computer Message Systems, IFIP, Sep., 1985, pp. 331-347.

K. A. Lantz, "An Experiment in Integrated Multimedia Conferencing", Proceedings of the Conference on Computer-Supported Cooperative Work'86, Dec. 1986, pp. 533-552.

A. Poggio et al., "CCWS: A Computer-Based, Multimedia Information System", Computer, Oct. 1985, pp. 92-103.

The Rapport Multimedia Conferencing Sys—A Software Overview, Ensor et al. Mar. 10, 1988.

"Distributed Desktop Conferencing Sys (Mermaid) Based on Group Architecture", Maeno et al., Jun. 28, 1991.

"Distributed Desktop Conferencing System With Multiuser Multimedia Interface", Watabe et al. May 1991.

Ultrix Worksystem Software X Window System Protocol: X Version 11, Digital Equipment Corporation, Order No. AA-MA98A-TE(1988).

OSF/Motif Programmer's Guide, Revision 1.1, Open Software Foundation, (Englewood Cliffs, NJ: Prentice Hall) (1990, 1991).

Palmer and Palmer, "Desktop Meeting", LAN Magazine, 6(11):111-121 (Nov. 1991).

D. Comer, "Internetworking with TCP/IP, vol. I: Principles, Protocols, and Architecture", 2nd Edition, pp. 1-8, 337-346, 505 (Prentice Hall: Englewood Cliffs, New Jersey 1991).

C. Nicolaou, "An Architecture for Real-Time Multimedia Communication Systems", IEEE Journal on Selected Areas in Communications, vol. 8, No. 3, Apr. 1990, pp. 391-400.

E. Schooler, "Conferencing and Collaborative Computing", Multimedia Systems, vol. 4, 1996, pp. 210-225.

S. Shenker et al, "Managing Shared Ephemeral Teleconferencing State: Policy and Mechanism", Lecture notes in computer science, vol. 882, 69, 1994.

E. Schooler, "Case Study: Multimedia Conference Control in a Packet-switched Teleconferencing System", Reprinted from the Journal of Internetworking: Research and Experience, vol. 4, No. 2, Jun. 1993, pp. 99-120.

E. Schooler, "Multimedia Conferencing: Has it come of age?", IEEE Journal on Selected Areas in Communications, 1991, pp. 707-716.

S. Casner et al., "N-Way Conferencing with Packet Video", Reprinted from the Proceedings of the Third International Workshop on Packet Video held Mar. 22-23, 1990 in Morristown, NJ, ISI Reprint Series, ISI/RS-90-252, Apr. 1990, pp. 1-6.

E. Schooler et al., "A Scalable Multicast Architecture for One-to-many Telepresentations", Multimedia Computing and Systems, Proceedings, IEEE International Conference, 1998, pp. 128-139.

Gemmell et al., "An Architecture for Multicast Telepresentations", Journal of Computing and Information Technology—CIT, vol. 6, No. 3, pp. 255-272.

M. Chen et al., "Designing a Distributed Collaborative Environment," Communication for Global Users, Including a Communications Theory Mini Conference, Orland, Dec. 6-9, Institute of Electrical and Electronics Engineers, p. 213-219.

W.H. Leung et al., Multimedia Conferencing Capabilities in an Experimental Fast Packet Network, Proceedings of the International Switching Symposium, Yokohama, Oct. 25, 1992, Institute of Electronics, Information and Communication Engineers, pp. 258-262.

Dynamic Conference Call Participation, IBM Technical Bulletin, pp. 1135-1138, Aug. 1985.

R. Bubenik et al., Multipoint Connection Management in High Speed Networks, INFOCOM, 1991, pp. 59-67.

C. Kim et al., "Performance of Call Splitting Algorithms for Multicast Traffic", INFOCOM, 1990, pp. 348-356.

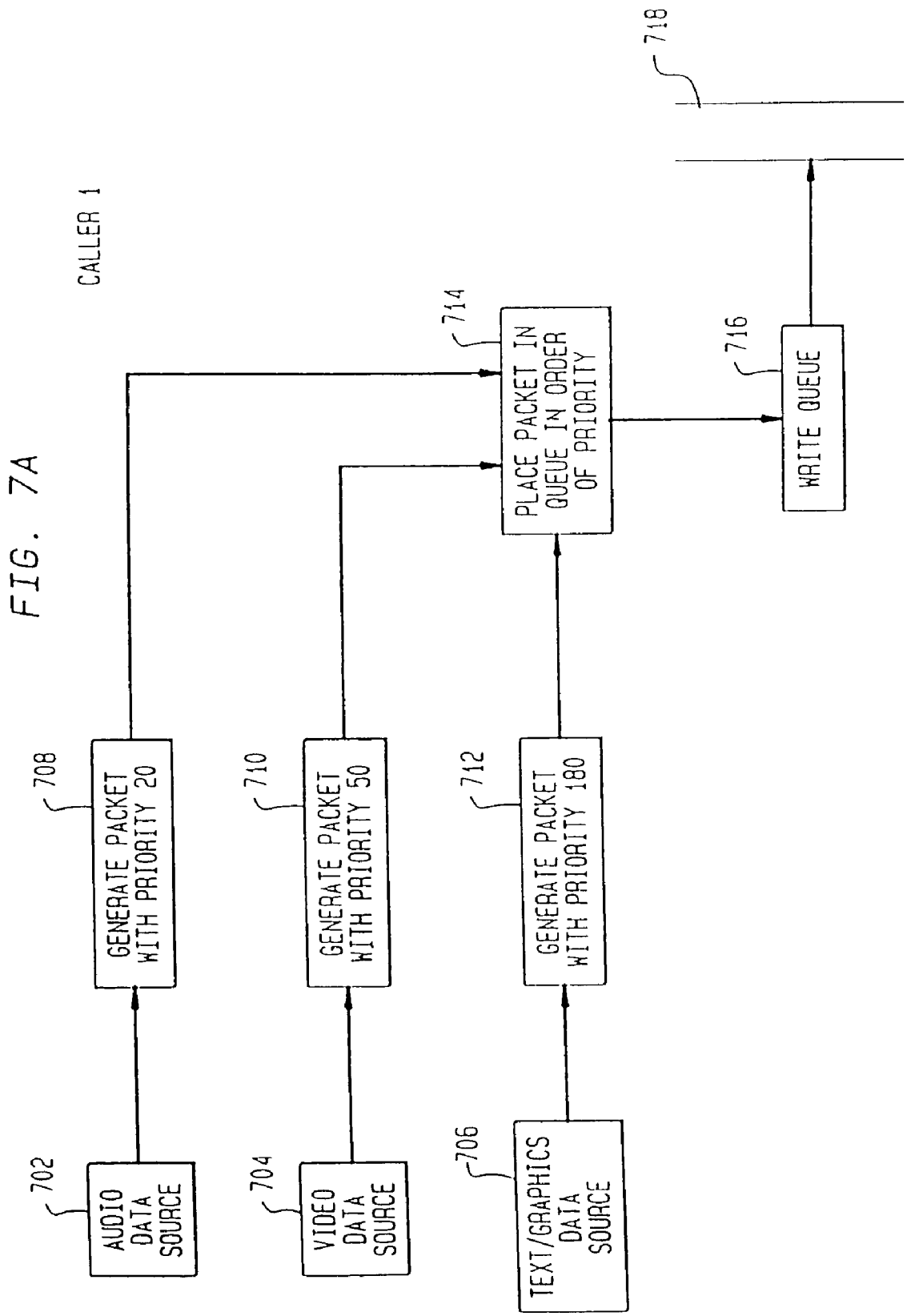

APPARATUS FOR MULTIPLE MEDIA DIGITAL COMMUNICATION

This application is a continuation of application Ser. No. 10/804,776 filed Mar. 19, 2004, which is a continuation of application Ser. No. 09/596,835 filed Jun. 19, 2000 of the same title, now U.S. Pat. No. 6,738,357 which is a continuation of prior application Ser. No. 09/437,269, filed Nov. 10, 1999, now U.S. Pat. No. 6,104,706, which is a continuation of Ser. No. 08/795,798, filed Feb. 5, 1997, now U.S. Pat. No. 5,995,491, which is a continuation of Ser. No. 08/626,580, filed Apr. 2, 1996, now U.S. Pat. No. 5,623,490, which is a continuation of Ser. No. 08/073,956, filed Jun. 9, 1993, now abandoned. This application is related to co-owned and co-pending application Ser. No. 10/804,776 filed Mar. 19, 2004 of the same title.

FIELD OF THE INVENTION

The present invention relates to the field of digital communications systems, and more particularly to systems transporting multiple media (multimedia) and/or communicating such multimedia through a plurality of connections to multiple callers.

BACKGROUND OF THE INVENTION

In the prior art, multimedia communications, such as videoconferencing systems for providing two way video and audio, are well known. Given sufficient bandwidth and dedicated independent channels, (e.g. 6 Mhz for an analog video channel, 3 Khz for an audio link over a standard analog telephone line, etc), videoconferencing between two callers can be realized. However, communication channels providing 6 Mhz video bandwidth are not generally or universally available. A major obstacle to wide spread implementation and acceptance of multiple media conferencing systems is the limited bandwidth of the available communication channels. In addition, typical communication channels available on packet switched networks such as AppleTalk, from Apple Computer, California, USA, or Netware from Novell Inc, Oregon, USA, do not provide the continuous real time analog or digital connection of a telephone line or modem. Instead, packet switched networks provide non-real time bursts of data in the form of a switched packet containing a burst of digital data. Thus, in addition to bandwidth limitations, packet switched networks present delay limitations in implementing real time multiple media conferencing systems. The same bandwidth and time delay limitations which apply to all time division multiple access (TDMA) communication systems and similar schemes present obstacles to achieving real time multimedia communications.

Typically, the problem of videoconferencing two callers is approached by compressing the composite video signal so that the resulting transmitted data rate is compatible with the available communication channel, while permitting acceptable video and audio to be received at the other end of the communication channel. However, solutions in the past using lossy compression techniques, have been limited to compromising quality in order to obtain acceptable speed. Recently, non-lossy compression techniques have become available. The problem still remains as to how to match the bandwidth and timing constraints of available digital formats to the available communication channels, both present and future.

SUMMARY OF THE INVENTION

The present invention is embodied in a digital communication system where multiple media data sources are time multiplexed into a packetized data stream. At both the transmit side, and the receive side, audio packets are given priority processing over video packets, which in turn have priority over text/graphics data packets. Continuous real time audio playback is maintained at the receiver by delaying the playback of received audio in a first in/first out (FIFO) buffer providing a delay at least equal to the predicted average packet delay for the communication system. Optionally, the average system delay is continuously monitored, and the audio and video playback delay time as well as audio and video qualities are adjusted accordingly. In another embodiment of the invention, a conference of three or more callers is created by broadcasting a common packetized data stream to all conference callers. Use of the present invention further permits an all software implementation of a multimedia system.

1. In accordance with a first aspect of the present invention, multiple data sources forming data packets are combined into a prioritized data stream.

The present invention is embodied in a method and apparatus for combining data from a plurality of media sources into a composite data stream capable of supporting simultaneous transmission including multiple video and graphic signals and real time audio. Video, audio and other signals are integrated in a non-standard transmission format determined by a novel streaming algorithm and prioritization scheme designed to provide the best balance between transmission quality and realization of real time rendition of each.

For example, each data type packet at the transmitter is assigned a priority between 0 and 10000, with 0 being the highest priority and 10000 the lowest. An audio packet is given priority 20, a video packet is given priority 50. Screen data packets and file data transfer packets are both given priority 180.

Before transmission on the communication channel, packets are placed in a queue according to priority order. As new packets are generated, the queue is reorganized so that the new packet is placed into its proper priority order.

At the receiver, each task runs according to its assigned priority. Packets with priorities between 0 and 100 are processed first, to the exclusion of packets with priorities 101 through 10000. Audio, being the highest priority (20), is processed first to the exclusion of all other packets. Within the class of packets with priorities between 101 and 10000, packets are processed according to relative priority. That is, higher priority tasks do not completely shut out tasks of lower priority. The relationship among priorities is that a priority 200 task runs half as often as a priority 100 task. Conversely, a priority 100 task runs twice as often as priority 200 task. Tasks with priorities between 0 and 100 always run until completion. Thus, video, screen data and file data, processing tasks are completed after audio processing in accordance with the relative priority of the packets.

A multi-tasking executive dynamically reassigns task priorities, to efficiently complete all tasks within the available time, while performing the highest priority tasks first. At any given time, there are different tasks all at different priorities, all yielding to each other. In general, a task yields to a higher priority task, if it is not running an uninterruptable sequence. If the current task completes its cycle, its priority is reassigned to a lower priority. If the priority of two or more tasks is equal, then the multi-tasking executive executes each task in a round robin fashion, performing a portion of each task, until the completion of all tasks with the same priority.

The assignment of packet priorities, and processing according to priority assures that audio will be given precedent over video, while audio and video will be given precedent over both screen data and file transfer data.

As indicated above, continuous real time audio playback is maintained at the receiver by delaying the playback of received audio in a first in/first out (FIFO) buffer having a size at least equal to the predicted average packet delay for the communication system. Optionally, the delay of the audio FIFO may be made variable. A variable delay audio FIFO buffer at the receiver allows the system to shrink or grow the time delay between one machine and the other. The ability to shrink or grow the difference in time between the sender and receiver permits the system of the present invention to compensate for indeterminate system delays. If the changes are slight, the difference in pitch is not noticeable. For greater changes, the technique of audio resampling may be used to increase or decrease the rate of audio playback without changing the pitch of audio content.

Similarly, video playback continuity at the receiver may also be improved by delaying the playback of received video in a first in/first out (FIFO) buffer having a size at least equal to the predicted average packet delay for the communication system. The delay of the video FIFO may be made variable, allowing the system to shrink or grow the time delay between one machine and the other to compensate for indeterminate system delays. Again, if the changes are slight, the change in frame rate is not noticeable. However, video data does not age as quickly as audio data. Therefore a smaller video FIFO can be used. Also, a video image may have short discontinuities without a perceived loss of the video connection. Audio playback, on the other hand, is more sensitive to discontinuities, and it is more important to maintain continuity at the receiver. Ideally, when both audio and video are used in a multimedia conference, the delay for audio and video should be equal to make sure that they are synchronized. In the latter case, the actual system delay is calculated by finding the maximum delay of both audio and video packets.

Data from media sources tend to come in bursts. For example, audio data rates rise when speaking, and fall to zero during a silence. In the present embodiment, the silence between words provides the present system with an opportunity to catch up by refilling the audio FIFO buffer before it empties. In such manner, the present system compensates for the delay inherent in a packet switched, time delay variant, communication channel.

Similarly, video sources including graphic screen data, are generated in bursts. That is, the data rate for video ideally falls to zero when there is no motion. The data rate for transmitting screen graphics falls to zero when are no changes. When the caller changes the screen, (such as the collaborative work document displayed on the screen), data is generated.

Thus, following the priority scheme of the present invention, video is updated only when no speech data is being processed. However, processing of speech data does not included the playing of sound. Once the sound starts playing, there is no need to further spend time to process the sound. Sound playing needs no supervision. Therefore, video updating occurs while sound is playing. After speech is playing close to real time (with a delay), video text and graphics are updated in the background. Video, text, graphics and data files are updated at lesser priorities. Except for audio and video data, task priorities are re-assigned to assure that all tasks will be completed, and that a higher priority task will not completely prevent the lower priority tasks from being completed.

2. In accordance with a second aspect of the present invention, multiple signal packets are broadcast to a plurality of callers to create a common multimedia conference.

In addition to assigned priorities, data packets having multiple destination addresses are broadcast over a plurality of connections to multiple callers. Each caller receives the same data packets with assigned priorities, and processes the received packets in a similar manner. As new data is generated from each caller in the video conference, new data packets are broadcast to the other callers. Thus, due to the broadcast of data packets representing audio, video and screen data, all callers are conferenced together, each seeing and hearing each other, while discussing the same screen document. Additional callers can be added to the conference over a plurality of connections without adding undue burden, because in a conference, each caller needs to generate data only once, which is then transimtted either simultaneously or sequentially depending on the kind of connection, to other callers.

3. In accordance with a third aspect of the present invention data received on a first communication medium (for example on a broadband local area network, such as ethernet) are re-broadcast on a different communication medium (such as a telephone line) in order to conference callers on the different communication media in a common multimedia conference. The present invention thereby provides the option of desktop videoconferencing on standard computer networks and telephone lines.

4. In accordance with a fourth aspect of the present invention, apparatus for use in a communications network is disclosed. In one embodiment, the apparatus is adapted for communication with a first user machine and a second user machine, and comprises: first and second interfaces to first and second communication mediums, respectively, the first and second communication mediums being in communication with the first and second user machines, respectively; at least one connection routine adapted to cause signals to be sent to at least one of the first and second user machines to enable media type selections, at least one of the media type selections including a selection of at least two different media types; and a routine cooperative with at least one of the first and second interfaces to transmit a plurality of digital media packets corresponding to each of the at least two different media types. For at least one of the at least two different media types, at least a portion of the plurality of corresponding digital media packets are transmitted to at least one of the first and second user machines in accordance with the media type selections over one or more packet switched communication channels; In one variant, the first communication medium comprises a packet switched network, and the second communication medium comprises a non-packet switched network.

5. In accordance with a fifth aspect of the present invention, an apparatus for use in a telecommunications network is disclosed. In one embodiment, the apparatus comprises a computer readable medium having at least one computer program stored at least partly thereon, the at least one program being adapted to: place into teleconferencing communication one or more of a plurality of remote processing machines that are in signal communication with the apparatus via a packet switched network, and a telephony device coupled to the apparatus at least partially via a telephone line; transmit each of a plurality of packets to at least one of the plurality of remote processing machines over the packet switched network via one or more packet switched communication channels; and send signals of at least one media type via a telephone network to couple the telephony device into communication with the one or more of the plurality of remote processing machines. In one variant, the one or more packet switched communication channels have indeterminate system delays and bandwidth limitations that give rise to indeterminate packet loss, wherein each of the packets has a plurality of data fields associated therewith, at least one of the data fields comprising at least one destination address associated with a respective one of the plurality of remote processing machines. In at least one supported mode of communication, a first number of the plurality of packets is transmitted for delivery to a first subset of the plurality of remote processing machines while a second number of the plurality of packets is transmitted for delivery to a second subset of the plurality of remote processing machines, the first and second subsets not being identical.

6. In accordance with a sixth aspect of the present invention, an apparatus adapted to communicate with a first caller over a packet switched network, communicate via a telephone network with a second caller, and to relay communication signals between the first and second callers to enable communication therebetween, is disclosed. In one embodiment, the apparatus comprises: at least one processor; at least one connection routine running on the at least one processor, the at least one connection routine being operative to negotiate with a remote processing machine associated with the first caller, a selection of at least one media type from a plurality of media types including audio, video and data, and to configure according to the selection at least one media routine operative to process media data packets received from or to be transmitted to the remote processing machine over the packet switched network via one or more packet switched communication channels; and a signal interface to enable connection to the telephone network. The number of media types that the apparatus is capable of processing and the number of media types that the remote processing machine selects may be the same or different. The apparatus communicates with the remote processing machine indicating an available set of media types, and receives from the remote processing machine an indication of the selection.

7. In accordance with a seventh aspect of the present invention, network apparatus adapted to couple into communication a remote processing machine and a telephonic device is disclosed. In one embodiment, the telephonic device is in at least signal communication with the apparatus, and the apparatus comprises: a processor; and a routine running on the processor for negotiating with the remote processing machine a selection of at least one media type using a media type selection protocol that supports the description of a plurality of media types including audio, video and data, and to configure, according to the selection, the apparatus to process media data packets received from and to be transmitted to the remote processing machine over a packet switched network.

In one variant, the selection is of only audio, and the telephonic device is in signal communication with the apparatus via a non-packet switched network. The negotiation comprises a message format that supports the description of the audio, video and data media types.

In another embodiment, the routine is adapted to configure, according to the selection, the apparatus to process media data packets received from and to be transmitted to the remote processing machine over a packet switched network using one or more communication channels, the one or more communication channels including a single connection stream that includes packets of at least one media stream set up for each of the at least one media type by the remote processing machine and the telephonic device.

8. In accordance with an eighth aspect of the present invention, apparatus adapted to pass communication signals between a first user device connected to a packet switched network and a second user device connected to a telephone network is disclosed. In one embodiment, the apparatus comprises: at least one processor; at least one connection routine running on the at least one processor, the at least one connection routine being operative to negotiate with the first user device a selection of at least one media type using a media type selection protocol that supports the description of a plurality of media types including audio, video and data, and to configure, according to the selection, at least one media routine running on the at least one processor to process media data packets received from and to be transmitted to the first user device over the packet switched network via one or more packet switched communication channels, the one or more packet switched communication channels including a single connection stream that includes packets of at least two media streams set up for each of the at least two one media types by the first and second callers; and an interface adapted to operatively connect to the telephone network used to communicate with the second user device. In one variant, the selection is of only audio, and the negotiation comprises sending a first message and receiving a response message, and the apparatus passes information directly or indirectly between the first and second user devices.

These and other aspects of the invention are now described in detail herein.

BRIEF DESCRIPTION OF THE DRAWINGS

FIG. 7A is a block diagram of a multiple media communication system transmitter in accordance with the present invention.

FIG. 14 is a first configuration of the present invention for conducting a standard videoconference call over an ethernet network.

FIG. 15 is an alternate configuration of the present invention for conducting a standard videoconference call with collaborative data over an ethernet network.

FIG. 16 is an alternate configuration of the present invention for leaving a recorded multimedia message of a videoconference call with collaborative data over an ethernet network.

DETAILED DESCRIPTION

Figure 1A:
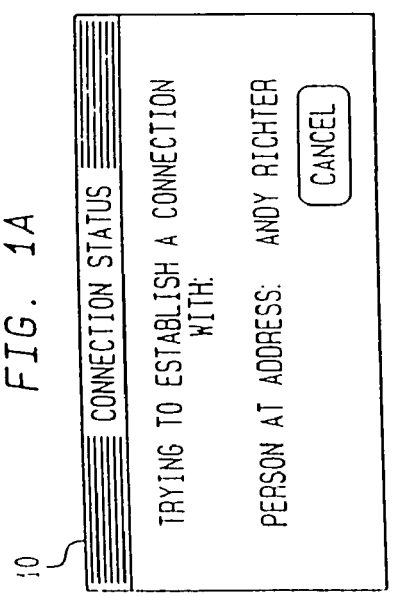
FIG. 1A is a dialog box indicating connection status as it would appear on the screen of a Macintosh computer used in conjunction with the present invention.
Figure 1B:
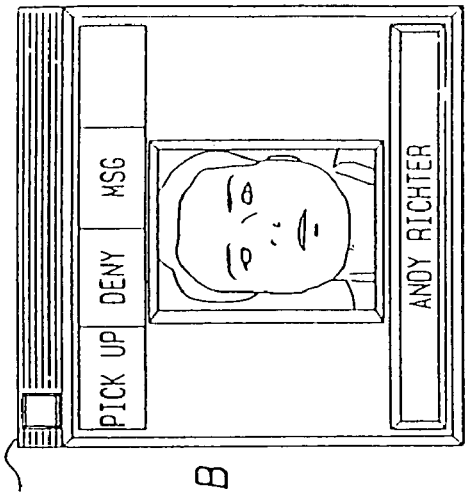
FIG. 1B is a dialog box indicating an incoming call as it would appear on the screen of a Macintosh computer used in conjunction with the present invention.
Figure 1C:
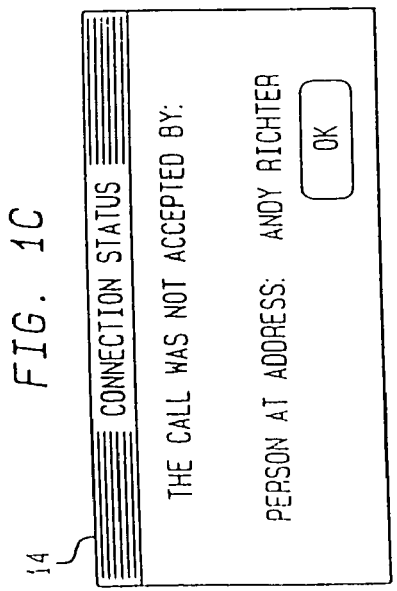
FIG. 1C is a dialog box illustrating the connection status message that would appear for a call that was not accepted as it would appear on the screen of a Macintosh computer used in conjunction with the present invention.
Figure 1D:
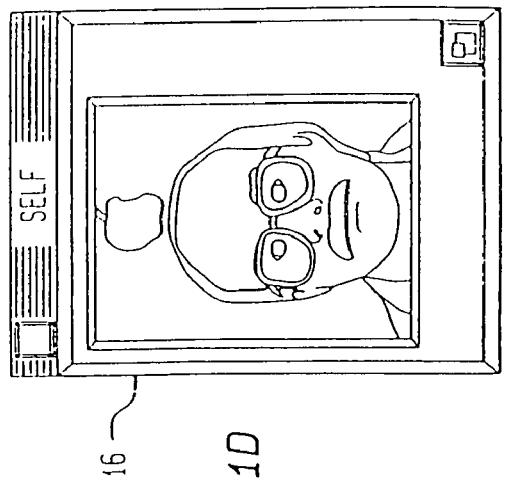
FIG. 1D is a window containing a moving video image as it would appear on the screen of a Macintosh computer used in conjunction with the present invention.

From the viewpoint of the caller, the present multimedia communication system operates as follows:

A caller on a desktop computer initiates a multimedia call by selecting a media type and desired connection with a second party. A dialog box of the type shown in FIG. 1A appears on the screen, illustrating the connection status. Caller 2, who receives the call, views a dialog box on his screen of the type illustrated in FIG. 1B to announce an arriving call. Caller 2 has the option of deciding to either pick up or deny the call, or to take a message. If the call is denied by caller 2, then caller 1 views a dialog box 14 as illustrated in FIG. 1C. For purposes of illustration, a video box 16 containing a video of the first caller 1 is shown in FIG. 1D. If the caller decides to take a message, caller 2 can now control the connection and optionally send an announcement message requesting a message.

Figure 2:
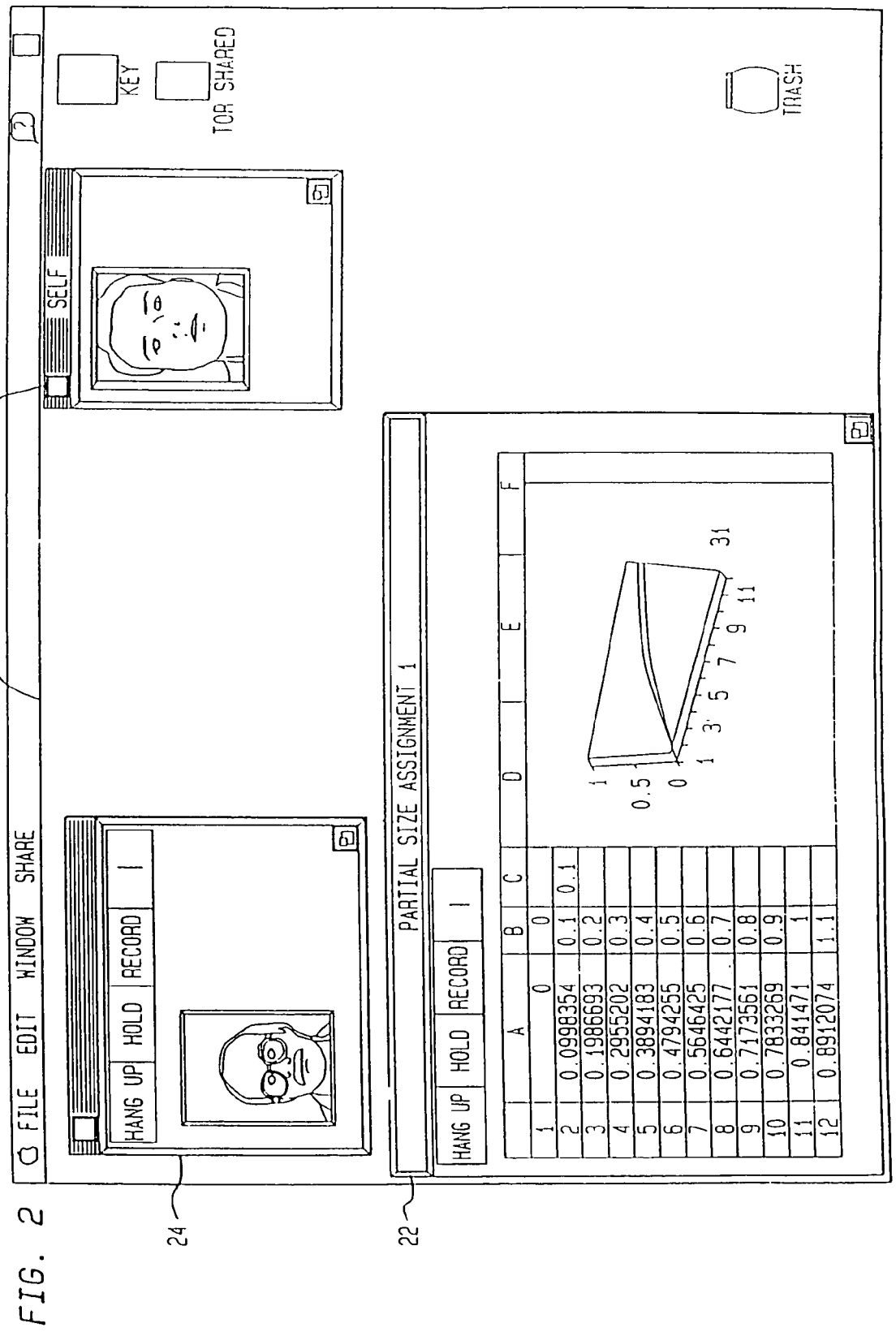
FIG. 2 is a video screen illustrating a video conference between two callers and sharing a common document.

FIG. 2 illustrates the screen appearance of a typical multimedia call with a collaborative document. On the screen 20 of caller 1, a video box 24 appears in which a moving video showing caller 2 appears. The screen of caller 2 is similar, but contains the image and sound of caller 1. On both the screens of callers 1 and 2 can be a collaborative document 22. Caller 1 and caller 2 are connected by moving video and two way audio and can discuss collaborative document. Caller 1 may manipulate the document and the changes will appear on the screen of caller 2. In an alternate embodiment, caller 2 may manipulate the document as well.

Figure 3:
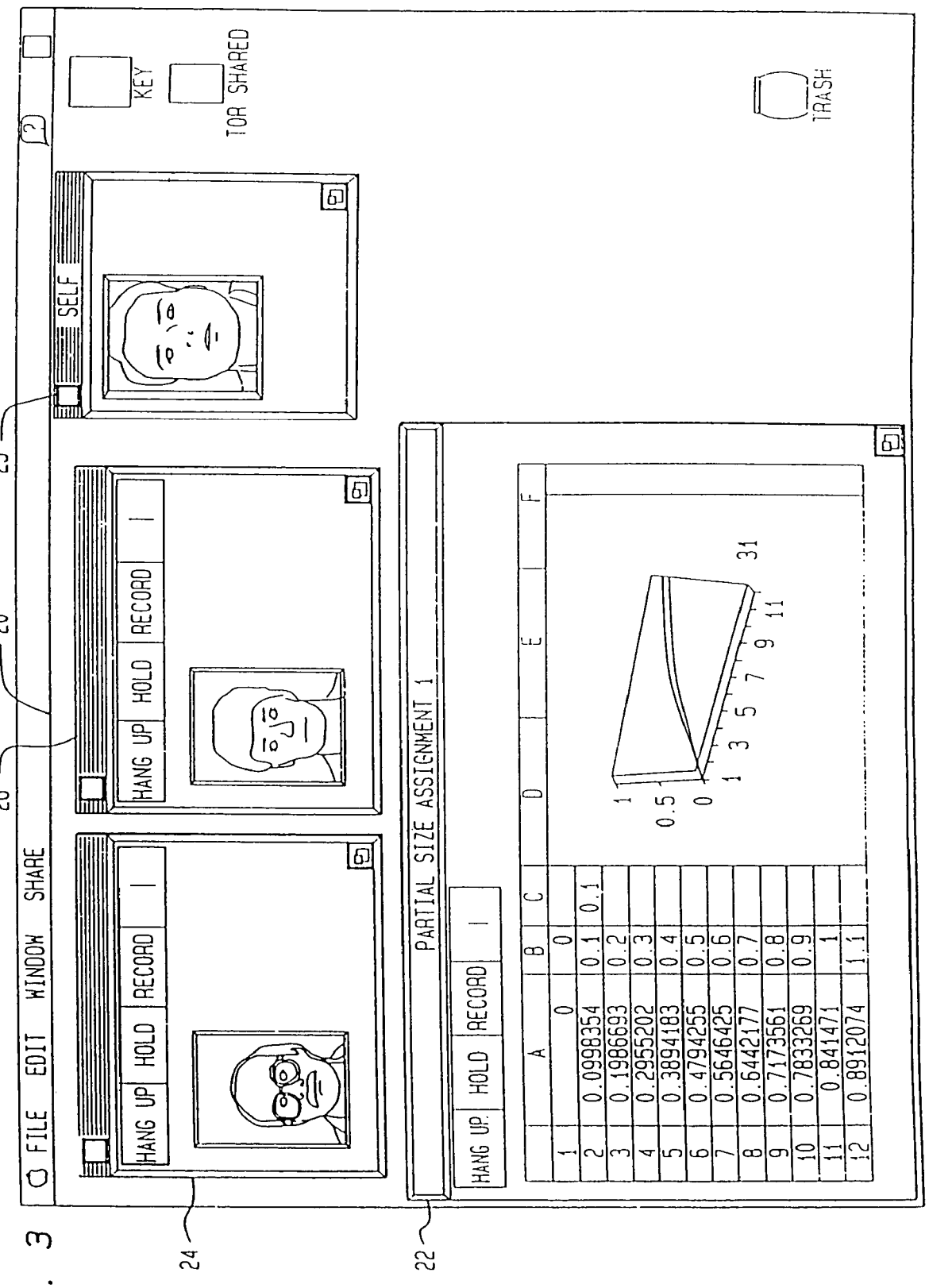
FIG. 3 is a video screen illustrating a video conference between three callers and sharing a common document.

FIG. 3 illustrates the screen 20 appearance of a three party video conference as it appears to caller 1. Caller 3 appears in a video box 26 as well as caller 2 in another video box 26, and the collaborative document 22. The other callers 2 and 3 see the other two members of their video conference on their screen as well as collaborative document 22. The size and position of video boxes 24 and 26 is selectable by caller 1. A video image 25 of caller 1 may also appear on the screen of caller 1 to let caller 1 see what is being transmitted. Reducing the size of video box 25 reduces the amount of (video) data which must be transmitted by the communication system.

Connection Establishment

Figure 4:
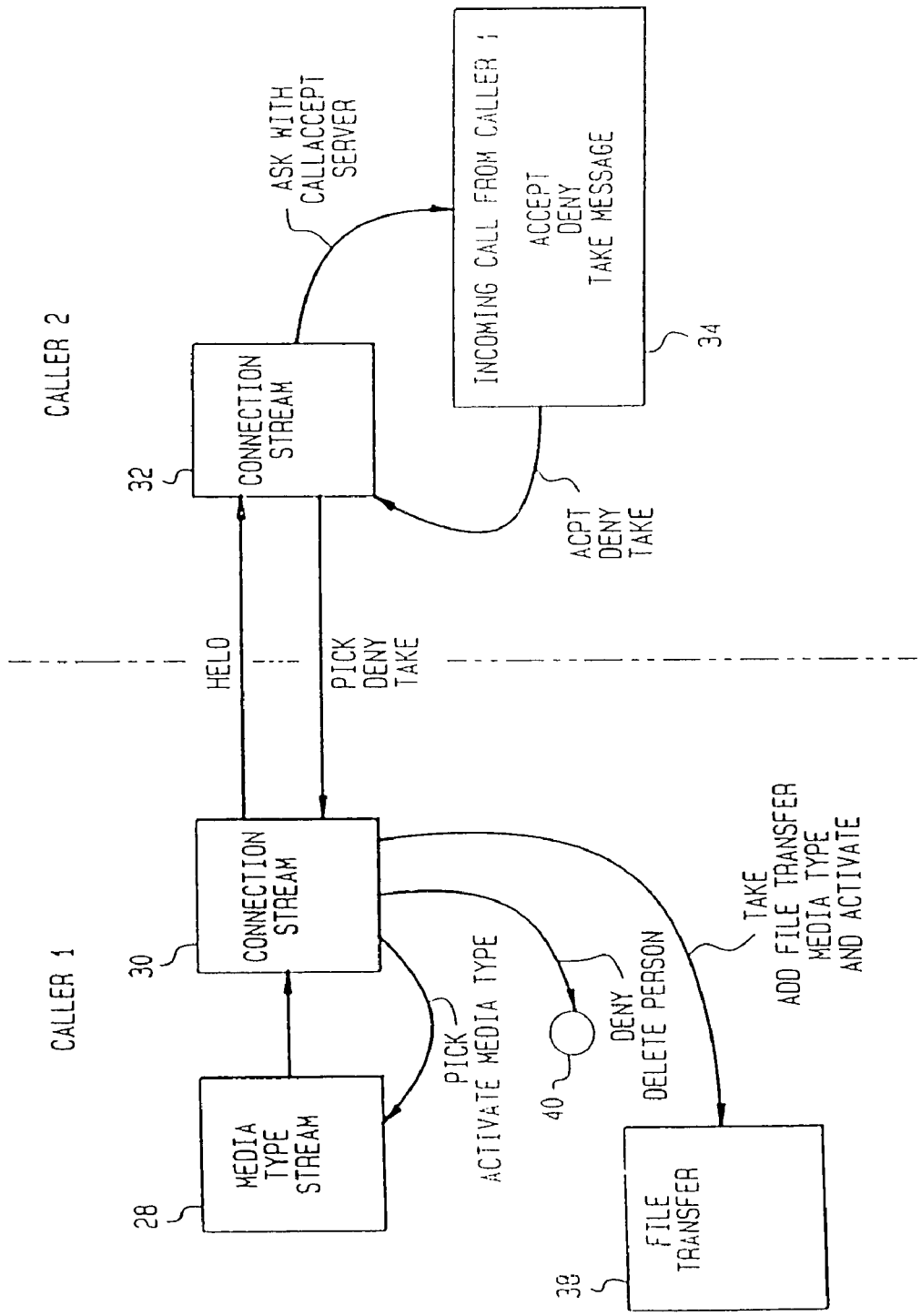
FIG. 4 is a block diagram illustrating the sequence of operations for establishing a connection in a multiple media digital communication system embodying the present invention.

The sequence of operation for establishing a connection between caller 1 and caller 2 over a communication network is illustrated in FIG. 4. The network may typically be AppleTalk, ethernet or any other commonly available local area network. Also, a connection can be established over a telephone line or other proprietay digital telephone lines such as ISDN.

The terms, "connection stream" and "media stream" used below are further defined in the description of FIGS. 8-11. For present purposes, such terms may be regarded as routines for handling data packets. Caller 1 selects a media type stream 28, and a connection stream 30, suitable for the communication medium. An initial message termed a helo packet is sent to a caller 2 connection stream 32. The connection stream 32 provides a dialog box to caller 2 informing that there is an incoming call from caller 1. Caller 2 can then decide 34 to either accept or deny the call, or alternatively to take a message if caller 2 is not present. The accept, deny and take commands are communicated back to the connection stream 32 which sends a return message across the communication system back to connection stream 30 and caller 1.

In addition to denying or taking the call, caller 2 has the option to pick a different media type. That is, for example, if the media type stream 28 of caller 1 is video, and caller 2 does not want to accept a video call but will accept an audio call, then the return message pick will indicate that caller 2 is picking audio as the media for an incoming call. At caller 1, connection stream 30 distributes the response from caller 2. Specifically, if the call is denied then the connection attempt is deleted 40. If a different media is picked, then a modification of the media type stream 28 is performed. If take a message was selected, then the appropriate file transfer 38 takes place to transmit an announcement file, and a message is requested to be sent back.

Figure 5:
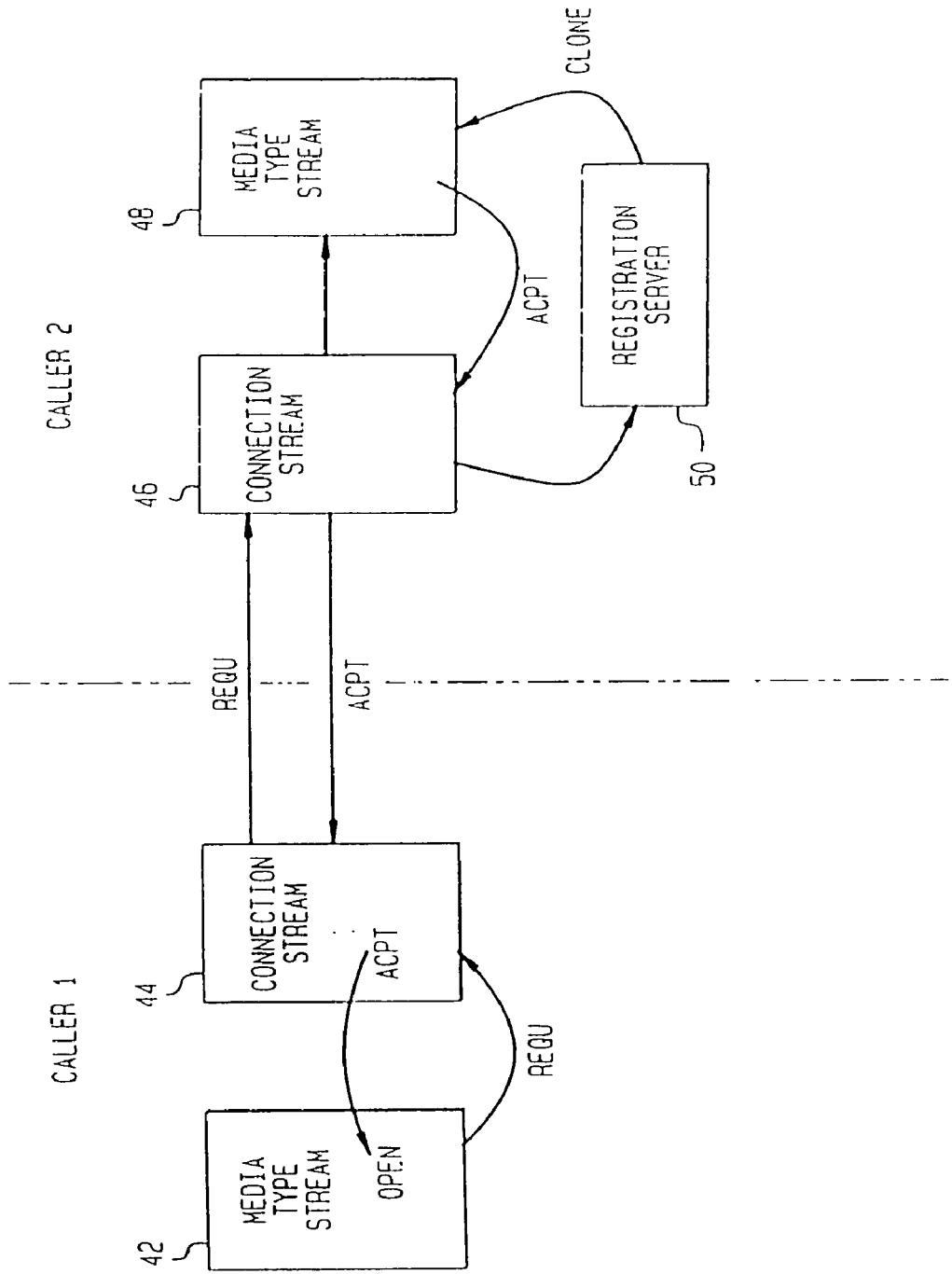
FIG. 5 is a block diagram illustrating the sequence of operations for establishing media types to be used in a conference call in a multiple media digital communication system embodying the present invention.

FIG. 5 illustrates the communication sequence for selecting the among the various media types between caller 1 and caller 2. For media type stream 42, a request is sent through connection stream 44 across the communication channel to caller 2 at connection stream 46 which is forwarded to media type stream 48. Caller 2 configures itself to accept the media type stream which is being presented to it by modification of its registration server 50 which clones the desired media type. If accepted, media type stream 48 sends a message through connection stream 46 across the communication medium to caller 1. The acceptance is received at connection stream 44 and communicated to media type stream 42 which opens up the connection for the given media type between caller 1 and caller 2.

Data Format in Packets with Priority and Multiple Destinations

Figure 6:
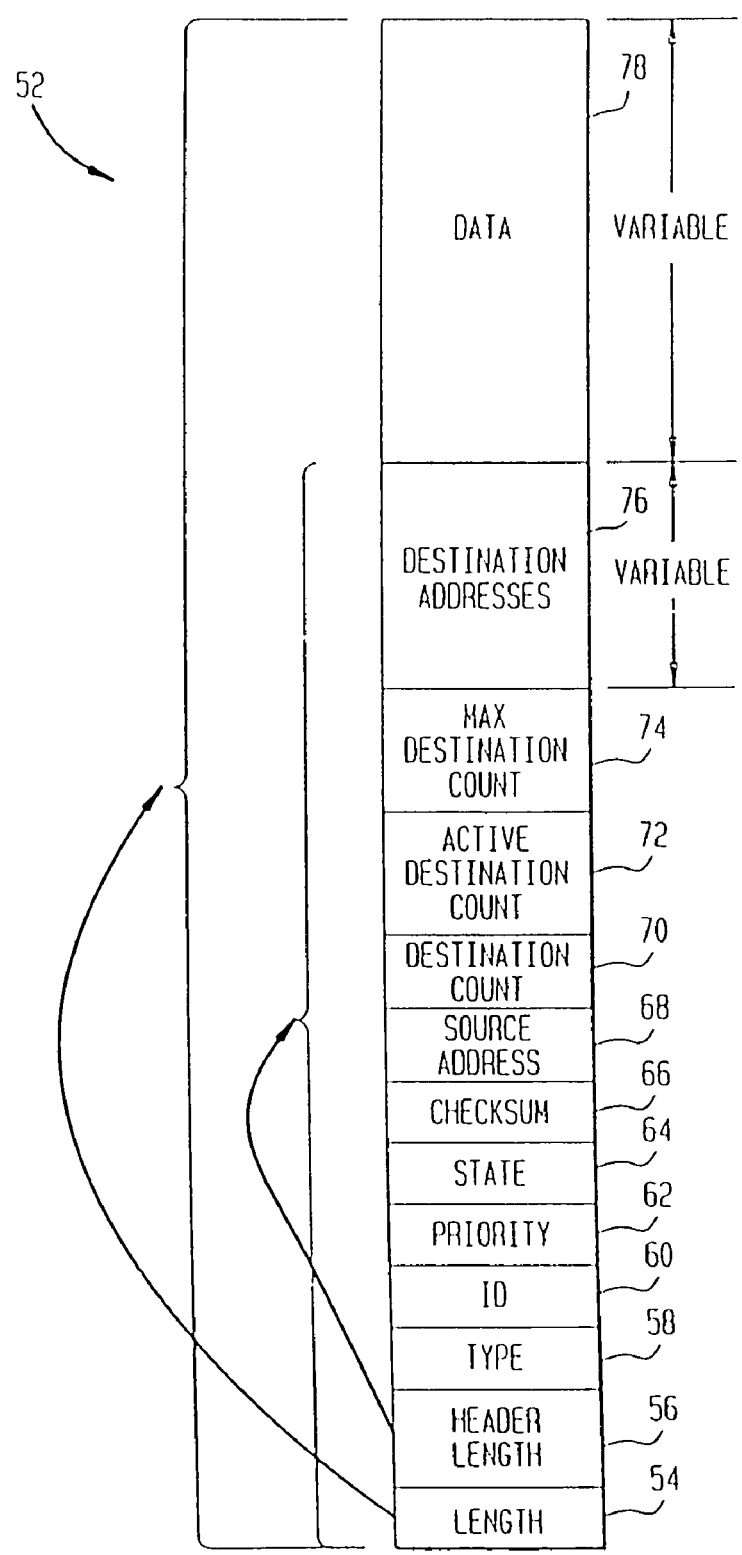
FIG. 6 is an illustration of a packet data format used in conjunction with the present invention.

FIG. 6 shows a packet data format 52 suitable for use in conjunction with the present invention. The length of the packet is indicated by data field 54. The length of the header is indicated by data field 56. The packet type and identification are respectively indicated by data fields 58 and 60.

The priority of the data packet is indicated in data field 62. When transporting multiple media digital data packets, the priority data field determines which of the packets has the highest priority in processing. Data fields 64 and 66 respectively contain information as to the message state, and a checksum for determining message errors. The packet source address is indicated at data field 68, and a destination count as to the number of destinations this packet will reach is indicated at data field 70. Also, an active destination count, the number of destination which have not yet received this packet, and a maximum destination count is provided in data fields 72 and 74 respectively.

The data packet 52 of FIG. 6 contains a number of destination addresses 76. The plural destination addresses provides a broadcast capability by which all the callers in a conference call can view common documents and see and hear each other. That is, when a data packet 52 contains audio data representing one speaker's voice, that packet is broadcast to all the destinations simultaneously. The same is true of the video and document updates. The destination addresses is followed by the actual variable length data of the data packet in field 78.

System Overview

A block diagram of a multiple media communication system transmitter is shown in FIG. 7A. A packet with priority 20 is generated 708 from audio data source 702. A packet with priority 50 is generated 710 from video data source 704. A packet with priority 180 is generated 712 from text/graphics data source 706. A WriteQueue 716 (a buffer memory for storing packets to be sent) is provided for holding packets to be transmitted over the communication channel 718. Control 714, responsive to packet generation, 708, 710, 712 places the packets in the WriteQueue 716 in order of packet priority. In hardware, a queue maybe a FIFO. In software, WriteQueue 716 is a linked list of packet containers with pointers to the next and previous packet containers. Since the Writequeue 716 is an ordered list, adding a new entry is achieved by modifying two pointers to add the new entry to the list in the proper order.

Figure 7B:
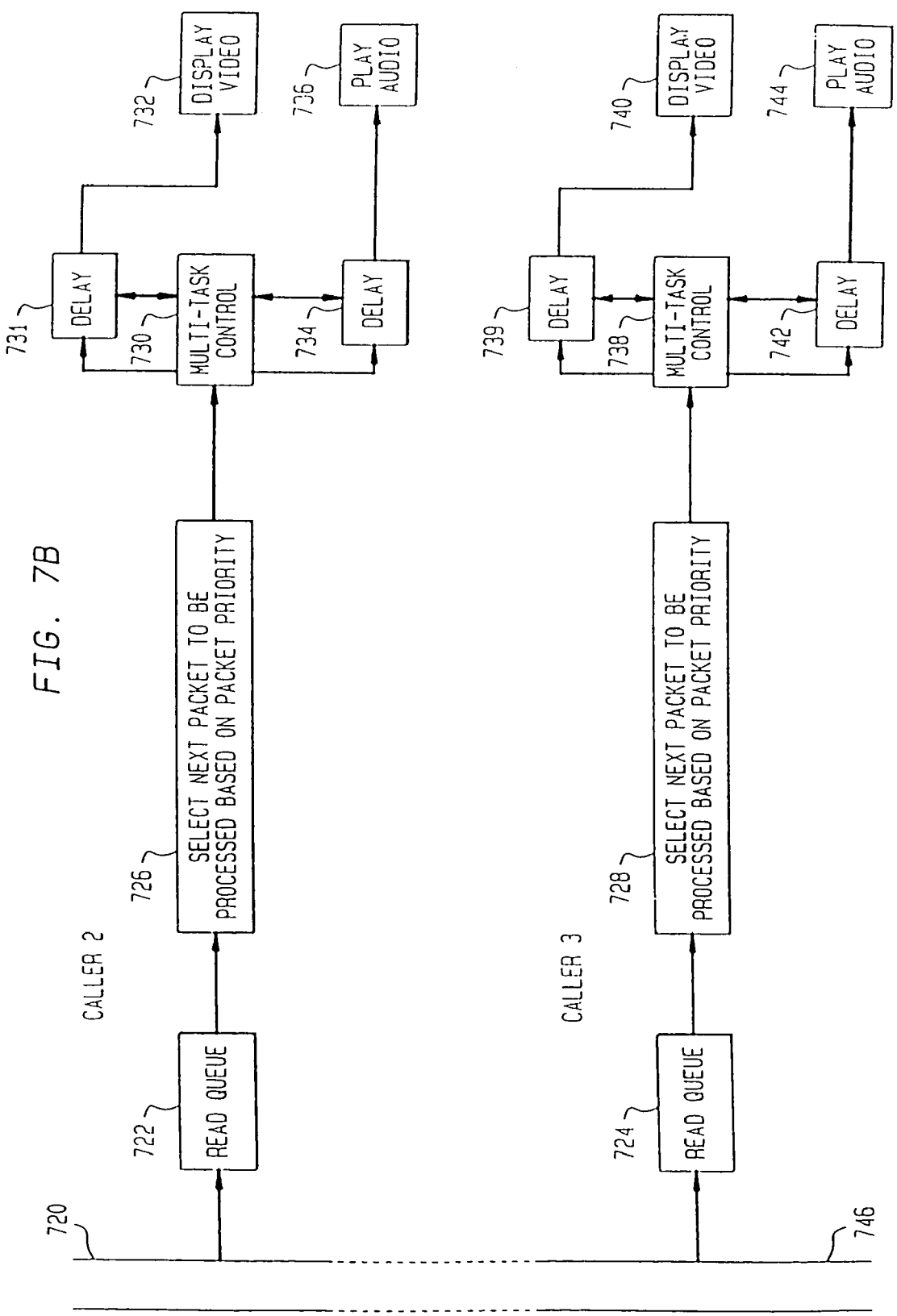
FIG. 7B is a block diagram of a multiple media communication system receiver in accordance with the present invention.

A block diagram of a multiple media communication system receiver is shown in FIG. 7B. Two substantially similar receivers, one for caller 2 and another for caller 3 are illustrated. Both callers are respectively connected to a broadcast communication channel 720, 746. A ReadQueue 722, 724 (a buffer memory for storing packets) receives packets for processing. A control means 726, 728 selects packets to be processed based on the packet priority. A multi-tasking control 730, 738 processes data-packets in accordance with assigned priorities. As indicated, audio packets have the highest priority and are processed first. Other packets are processed in accordance with priority in a multi-tasking environment which balances speed of execution among the different priority packets while making sure to complete all tasks. A variety of multi-tasking control techniques for completing multiple tasks simultaneously, giving priority to higher tasks, while devoting some system resources to complete the lowest priority tasks, are known to those skilled in the art.

Audio data playback is delayed in a delay 734, 742, as indicated above. Video data display is similarly delayed in delay 731, 739 to maintain synchronism between video and audio. The multi-task control 730, 738 sets the amount of delay (for both video and audio) in accordance with the predicted average delay of the communication channel 720, 746. Delayed audio is then displayed 736, 744 at the receiver for caller 2 and caller 3. Delayed video is simultaneous displayed 732, 740 at the receiver for caller 2 and caller 3. Furthermore, since callers 2 and 3 are both receiving the same packets broadcast by caller 1, both hear and view the same multimedia messages.

Multimedia communication is typically two way between all callers. It should be understood that caller 1, caller 2 and caller 3 all include the transmitter and receiver elements shown in FIGS. 7A and 7B. This does not mean, however, that all callers need to transmit or receive data. Each caller can choose to (or be required to) receive only or transmit only.

In operation, at caller 1 in FIG. 7A, successive multimedia data packets with assigned priority are generated 708, 710, 712 from respective multimedia sources 702, 704 and 706. As the packets are generated, each is placed 714 in priority order in a queue 716 and transmitted over a communication channel 718. If the channel capacity were unlimited, packets would be transmitted as soon as generated. However, in the normal case, generated packets may accumulate awaiting transmission because the communication channel capacity is limited. The present priority scheme assures that packets are transmitted in priority order with the highest priority packets transmitted first.

At the receiver, callers 2 and 3 in FIG. 7B both receive packets from the communication channel 720, 746. Received packets at callers 1 and 2, are processed in accordance with the received priority, to play back the received audio, video and display of the received text/graphics. Since both callers 2 and 3 receive the same packets, a three party videoconference call is created.

Continuity of audio playback is perceived as critical to a multimedia conference. Accordingly, audio packets, being assigned the highest priority, are sent as soon as possible, and at the receiver, are processed as soon as possible after receipt. Thus, audio packets tend to be delivered in the shortest time which the communication channel will allow.

The system of the present invention tolerates transmission errors inherent in a traditional packet switched system by discarding or retransmitting corrupted audio or video. For text files, the normal error detection and retransmission requests are used. Sound and video are distinguished from text or file data in that it is possible to tolerate some loss of sound and video and still maintain an acceptable quality. In the event of a detected error in the received audio or video packet, the receiver determines whether there is sufficient time to flag the error and request a retransmission, based on the predicted average delay time of the system. If there is not sufficient time, the corrupted packet is ignored. In such manner, network capacity is not wasted on retransmissions which will arrive too late and have to be discarded anyway. However, the lowest priority packets of text/graphics or computer file data which are not time dependent, are flagged for errors and retransmitted.

Object Oriented CPacketStream Streaming Method

Various types of streams are used to achieve multimedia communications. First, a connection stream provides the interface to the communication channel. Then, there is a media stream for each desired media. For example, there may be a video stream, an audio stream, a video and audio stream such as QuickTime, or a text/data/graphics stream representing files, graphic images of many types, or any other data required. The architecture is designed to support "drop in" streams for new kinds of collaborative data.

Figure 8:
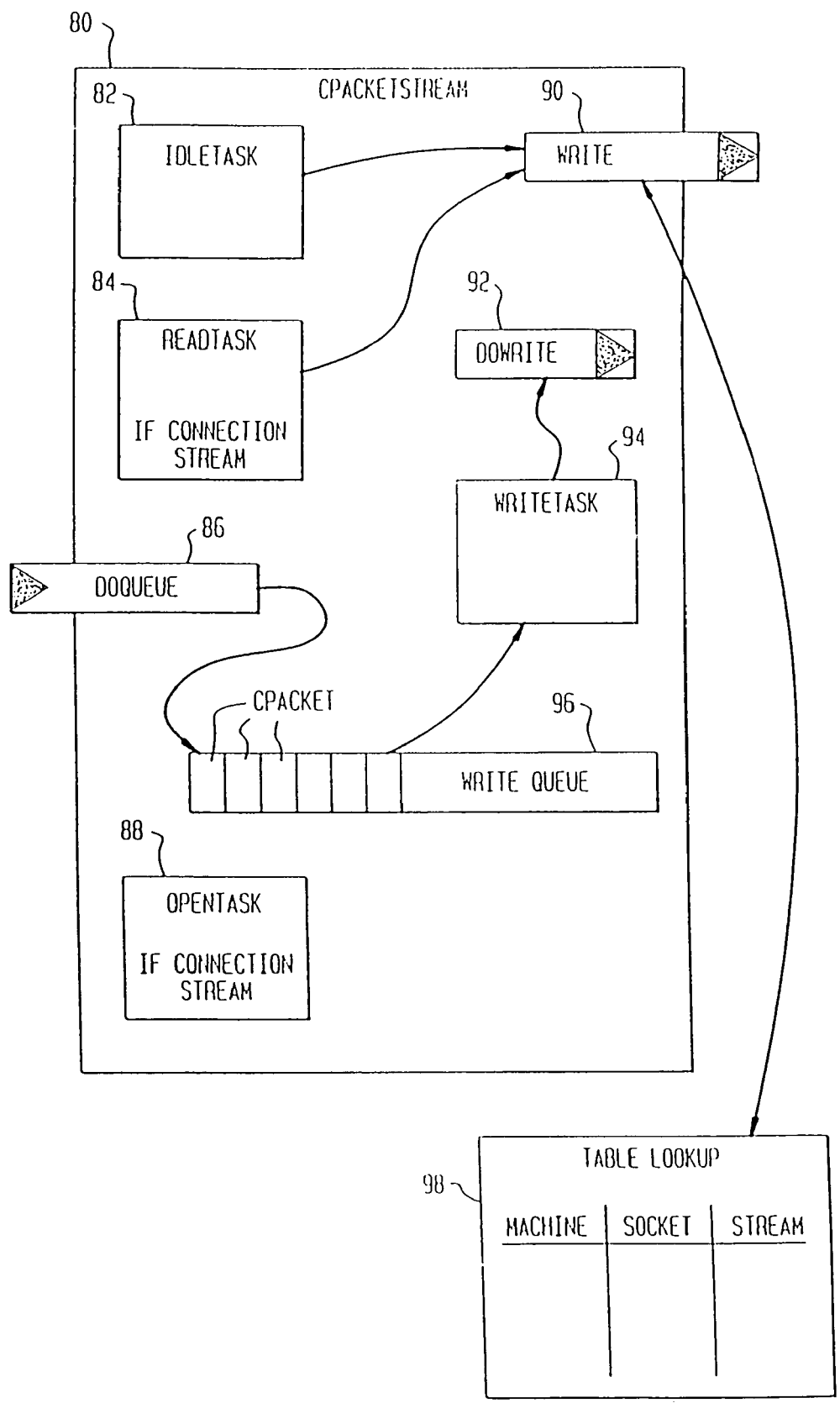
FIG. 8 is a block diagram of a method and apparatus for processing a data packet in accordance with the present invention.

The block diagram of FIG. 8 illustrates the method and apparatus for sending and receiving data packets, also termed CPackets. Each of the above methods and tasks is described in detail below, including pseudo code for realizing each of the methods and tasks on a general purpose digital computer. Although the preferred embodiment is described in terms of software operating in a Macintosh computer environment, it will be understood that the present multiple media communication system of the present invention may be implemented in hardware, such as in dedicated logic, microprogrammed bit slices, programmable arrays and the like.

CPacketStream 80 is a software component which is responsible for handling CPackets to establish communication channels between machines. Each CPacketStream 80 is composed of a set of routines (or methods) responsible to interact with CPackets. These methods are used in turn by a set of tasks running in each CPacketStream. The task types and methods (or routines) available for packet handling are summarized as follows and described in more detail below.

| TASKS: | |
|---|---|
| WriteTask | (prioritized multi-tasking of received CPackets) |
| ReadTask | (connection stream distributes received CPackets) |
| IdleTask | (send final packet and initial packet) |
| OpenTask | (open connection stream) |

| METHODS | |
|---|---|
| DoQueue | (puts a Cpacket in the WriteQueue) |
| DoWrite | (generates actual output from packet data) |
| DoIdle | (idle between packets) |
| Write | (lookups destination and calls DoQueue) |
| WriteDone | (acknowledges receipt of packet) |
| WriteQueue | (A buffer containing CPackets in priority order) |
| ReadQueue | (A buffer containing CPackets in received order) |

CPacketStream::WriteTask 94

The WriteTask 94 is responsible for distributing packets contained in the WriteQueue 96 in each CPacketStream 80. The priority of this task is at least as high as the packet it is currently handling. This task is in a loop currently scanning the WriteQueue 96, if the queue is empty then the task will sleep. The CPacketStream::DoQueue method will put a CPacket into the WriteQueue 96, and wake the WriteTask 94 up. Therefore, the WriteTask 94 will be the one displaying or playing the packets.

```
CPacketStream::WriteTask
    if a packet in WriteQueue
        call DoWrite for that packet to handle data
    end
end
CPacketStream::ReadTask 82
```

The ReadTask 84 is responsible for reading CPackets from a particular channel, and redistributing among CPacketStreams 80 in that machine. This type of task is only appropriate for a connection (media) CPacketStream 80. (In a way it is similar to the WriteTask 94, serving a WriteQueue 96, but in the reverse direction, and corresponding to receiving data packets in a ReadQueue)

```
CPacketStream::ReadTask
    if a new packet read
        write a new packet
    end
end
CPacketStream::IdleTask 82
```

The idle task 82 is responsible for generating and sending 'helo' (the initial packet) and 'kiss' (the final packet) CPackets. It is also responsible to execute idle time events in some particular streams. For example, a Communications Tool (from Apple Computer) needs to have an idle call every so often in order to handle a particular connection.

```
CPacketStream::IdleTask
    if initial packet not sent
        if initial packet not created
            create initial packet
        end
        sent initial packet
    end
    idle stream if necessary
    if stream should die
        if final packet not created
            create final packet
        end
        send final packet
    end
    if final packet sent and stream should die
        disable and delete the streams
    end
end
```

An OpenTask 88 is used when the connection is being first opened and the connection negotiated between callers. At that time, the contents of the table lookup 98, which defines media types and connection streams is determined. In addition to these tasks, there are several methods that are called by these tasks in order to communicate with the stream. These methods are:

CPacketStream::DoQueue 86

This is the method that is called in order to give a packet to a particular stream. Most streams will immediately write the packet to a WriteQueue 96, and activate the WriteTask 94 in order to handle that particular packet.

```
CPacketStream::DoQueue 86
    put packet into the write queue
    wakeup WriteTask
end
CPacketStream::DoWrite 92
```

The WriteTask 94 will call this routine to actually handle the packet's content. For a connection stream, this is the output routine of a CPacketStream 80 to the communication channel. For a video stream, this routine will decompress and display the video contained in a packet. For other media streams, the DoWrite 92 routine will carry out the appropriate process to get the data displayed, played or otherwise.

```
CPacketStream::DoWrite
    handle the packet's data
    end
CPacketStream::DoIdle
```

This is the routine which can be used to idle the CPacketStream 80. Many streams can use this to do periodic tasks.

```
CPacketStream::DoIdle
    perform periodic task
    end
CPacketStream::Write 90
```

This routine will look up in table 98 the destination address for each destination in the packet, and the call DoQueue 86 for each destination packet stream. Each DoQueue 86 can refuse the packet until a later time, and therefore the packet contains flags for each destination address such that a complete write will mark that address completely written. A packet therefore contains an active destination count (72 in FIG. 6).

```
CPacketStream::Write
    for all destination addresses in packet
        lookup destination stream in address table
        if alias entry and 'info' packet
            add writeAsRemoteInfo flag
        end
        if found
            call DoQueue method for destination stream
            if successful
                mark destination address write complete
            end
        else
            mark destination address write deleted
        end
    end
end
```

Data packet flow and handling through CPacketStream 80 is from calls to DoQueue 86 which will write a CPacket into the WriteQueue 96, and then activate WriteTask 94, which processes the Cpackets, and calls DoWrite 92 to distribute the Cpackets contained in the WriteQueue 96.

CPacketStream::WriteDone

This routine will be called to dispose of the packet generated by a certain stream. It can be used for synchronization. A connection stream has the option of calling WriteDone to transfer acknowledge packets on the outgoing connection. The CPacketStream owns the packet which it sends, until all other streams are done with the packet. At that time, the packet ready to be deleted. However, when a packet (e.g., video) is sent from one machine on to another machine, such as between an ethernet LAN (local area network) and a telephone modem, the packet (e.g., the video) is not actually being used. In such circumstances, the originating connection stream should hold the packet, until all other connections have used this packet on the other machine(s). Synchronization of packet receipt is accomplished by returning an acknowledge packet when the WriteDone function of the connection stream is called at each machine which receives the packet. This is an additional form of communications between machines to reinforce the normal packet communications. "Acknowledge" packets have the same priority as the information packets, the lowest packet priority.

Streaming Algorithm

Figure 9:
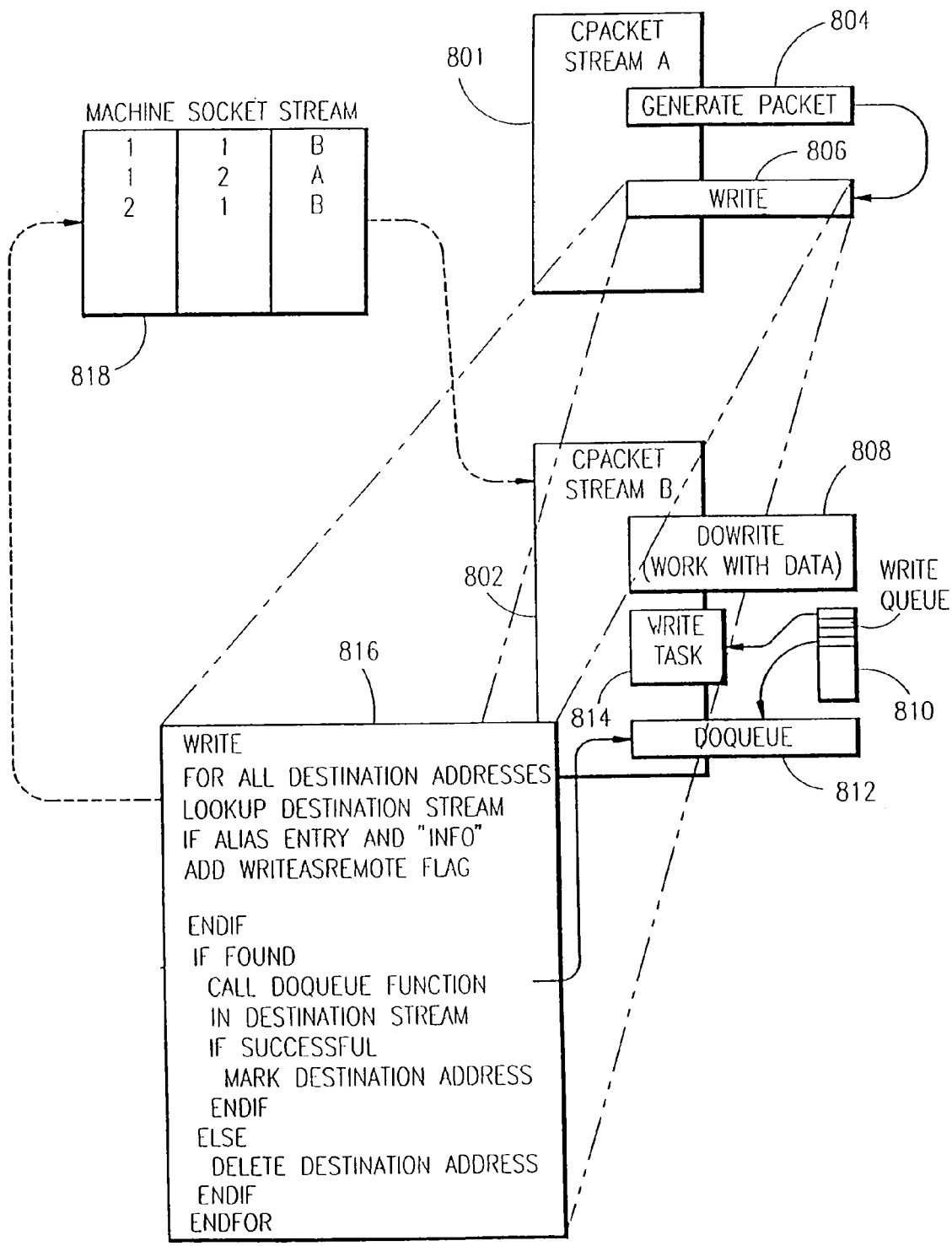
FIG. 9 is a block diagram illustrating the sequence of operation of a method and apparatus for processing data packets in accordance with the present invention.

A generalized representation of the use of the present streaming algorithm is shown in the block diagram of FIG. 9. Two CPacketStreams, CPacketStream A, 801 and CPacketStream B, 802 are shown. By way of example, if CPacketStream A was a connection stream, then CPacketStream B would be a media stream, such as a video stream. On the other hand if CPacketStream A was a video stream, such as from a frame grabber, then CPacketStream B would be a connection stream. In general, there is one stream for each type of media, plus one stream for each connection. That is, a separate connection stream is used for each caller. Thus, for a two way conference with one other caller, there is one connection stream, while for a three way conference there are two connection streams, one for each of the other two callers. In an alternate embodiment, such as may be used with future higher speed communication systems, a single connection stream may be used with more than one caller.

FIG. 9 also shows a lookup table 818 which is filled in when each stream is established for keeping track of the destination of the various packets. In operation, a packet is generated 804 and the Write function 806 is called. The pseudo code 816 for the Write function 806 contains a reference to a lookup to table 818, which returns an address to CPacketStream B, 802. CPacketStream B, 802 calls DoQueue 812, which writes the CPacket to WriteQueue 810. WriteTask 814 is activated to process the CPacket, which calls DoWrite 808 to generate the output routine of a CPacketStream 80 to the communication channel, or other appropriate media output.

Figure 10:
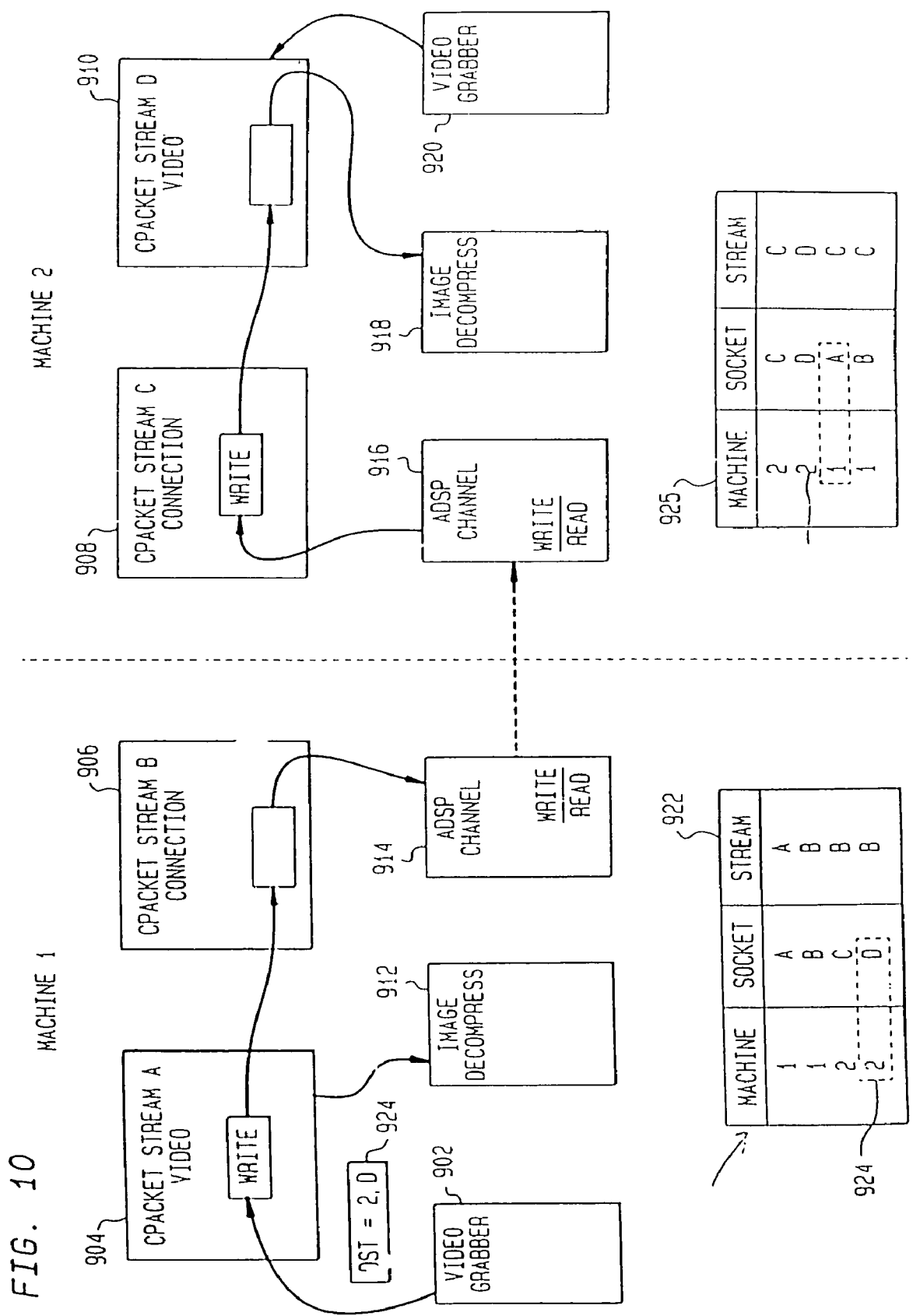
FIG. 10 is a block diagram of a method and apparatus for establishing a connection for specific media between callers used in conjunction with the present invention.

FIG. 10 illustrates the use of lookup tables to generate destination addresses from connection information between two given callers. By way of example, assume that CPacketStream A, 904 is a video stream connected to frame grabber 902 and image decompressor 912 at machine 1. A machine 2, CPacketStream D, 910 is also a video stream connected to a frame grabber 920 and image decompressor 918 at machine 2. Then, CPacketStream B, 906 is a connection stream coupled to a communication channel interface 914, such as for example a transmission source for an AppleTalk Data Streaming Protocol (ADSP) device. CPacketStream C, 908 is a connection stream coupled to a communication channel interface 916, shown as the receiving side of an AppleTalk Data Streaming Protocol device. Machine 1 uses table 922 to lookup the destination stream address 2,D for packets generated using data from video grabber 902. Similarly, machine 2 uses lookup table 925 to lookup the destination stream address 1,A for packets generated using data from video grabber 920.

Packet Acknowledgement

Figure 11:
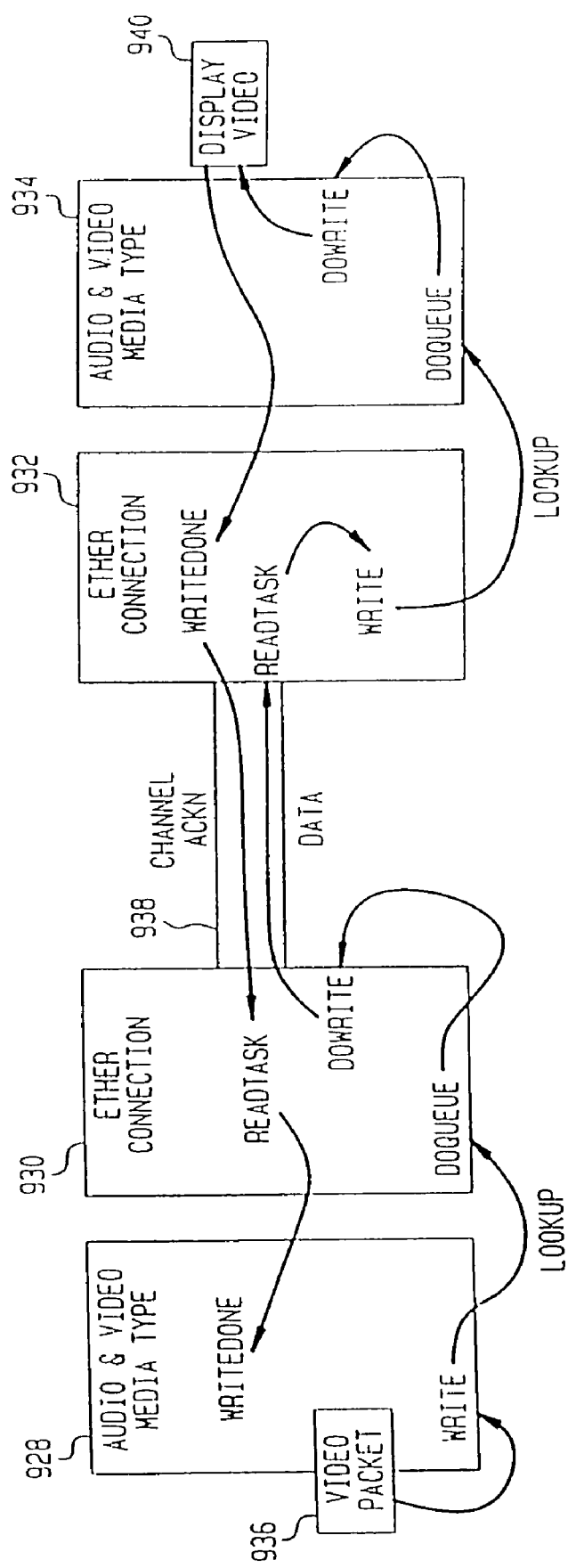
FIG. 11 is a block diagram illustrating the sequence of data packet flows with optional acknowledgement handshake packets.

A block diagram illustrating the use of an optional acknowledgement packet is shown in FIG. 11. A media stream 928, responsive to a video packet 936, calls the Write function, which through the appropriate lookup table, calls the DoQueue and DoWrite functions of connection stream 930, an ethernet connection stream. The video packet is transmitted on the ethernet communication channel 938 and received by the ReadTask and Write functions of connection stream 932. Thereafter, the DoQueue and DoWrite functions of media stream 934 are called through the appropriate lookup table which displays the data on video display 940.

The communication channel LAN protocol typically supports lower level acknowledgment functions. For example, it is known by the transmitting caller that the packet was received over the clear communication channel 938. Otherwise, the LAN protocol (at the ADSP level for example) would have returned an error indication. In addition to the acknowledge at the LAN protocol level, an acknowledge packet is generated when the received data is played (i.e., when the video data is displayed) in order to provide end to end synchronization information. The WriteDone function of connection stream 932 generates such acknowledge packet for return transmission across communication channel 938. Back at the originating transmitting caller, the ReadTask function of connection stream 930, calls WriteDone routine of media stream 928 to process the acknowledge packet. The receipt of an acknowledge packet also provides an indication of system delay for the media type of media stream 928, in this example, a video packet. The acknowledge packet contains a recorded time indicating when the video packet was actually used. Comparison of the recorded transmission time with the received recorded display time, provides a measure of the end to end system delay.

Prioritized Data Packet Processing

Figure 12:
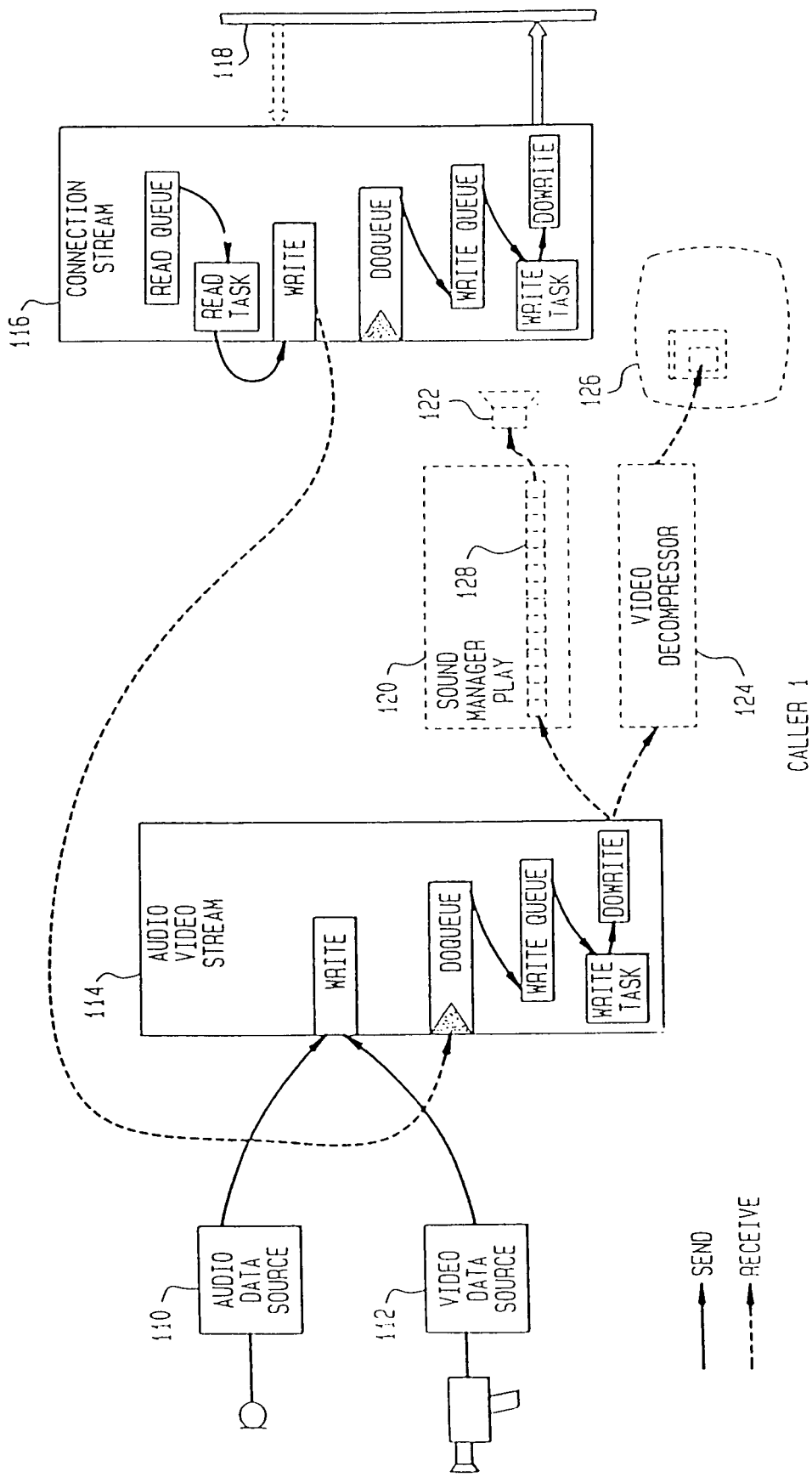
FIG. 12 is a block diagram of a multiple media digital communications system for sending and receiving multiple media for a first caller in accordance with the present invention.
Figure 13:
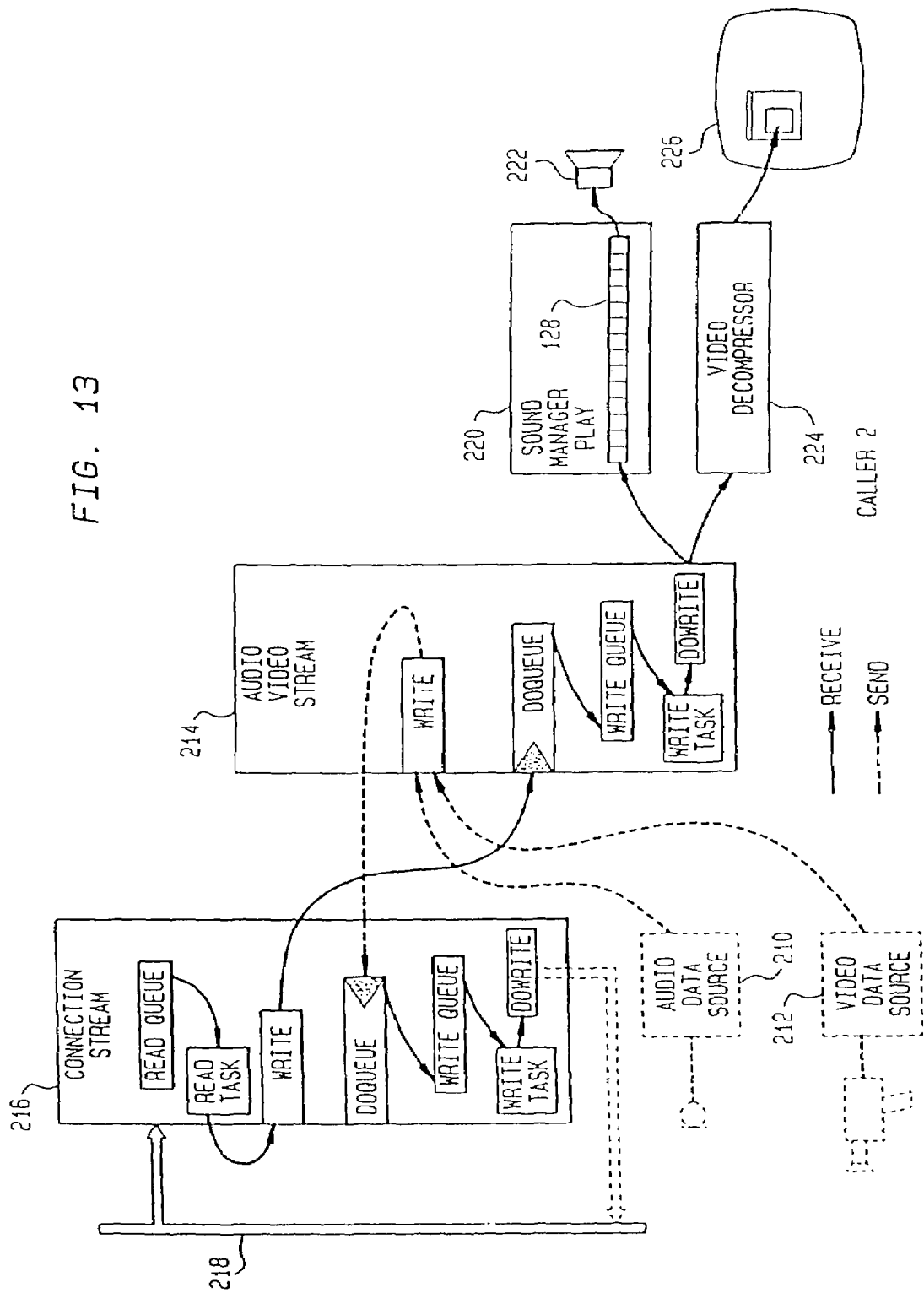
FIG. 13 is a block diagram of a multiple media digital communications system for receiving and sending multiple media for a second caller in accordance with the present invention.

A system block diagram is illustrated in FIGS. 12 and 13. FIG. 12 shows the transmission elements in solid lines and the receive elements in dotted lines. FIG. 13 shows the receive elements in solid lines and the transmit elements in doted lines.

In FIG. 12, and audio data source 110 and video data source 112 are coupled through audio/video stream 114 and connection stream 116 to data communication channel 118. In FIG. 13, data communication channel 118 is coupled to connection stream 216, and then to audio/video stream 214. Audio is played by sound manager 220, which includes a FIFO delay buffer 228. Video is played back by video decompressor 224 coupled to video display device 226.

For the return direction, FIG. 13 also shows audio data source 210 and video data source 212, coupled to the communication channel 218 through audio/video stream 214 and connection stream 216. At the transmission side in FIG. 12, audio is played by sound manager 120, which includes a FIFO delay buffer 128. Video is played back by video decompressor 124 coupled to video display device 126.

In operation in FIG. 12, data generated by audio source 110 and video data source 112 are placed into packets in audio/video stream 114, and forwarded to connection stream 116. The connection stream arranges the available packets in priority order before transmission on the network communication channel 118. Once transmission of a packet has begun, however, it is typically not interruptable. For example, if a video packet represents a video frame update, and the video packet transmission has started, no audio packet can be sent until the current packet is completed. If it is desired to improve audio transfer, the video frame update may be divided into smaller sub-frame packets. Then, an audio packet will be inserted during transmission of a complete video frame update, i.e., by insertion between sub-frame packets forming the video frame update.

In FIG. 13, data packets received by connection stream 216 are distributed to the audio/video stream 214. Audio data packets, having a higher priority represent a higher priority task. Thus, the sound manager 222 is given priority over the video decompressor 224. As indicated above, delay buffer 228 is set equal to the predicted average packet transmission delay of the communication system. Alternatively, the delay provided by delay buffer 228 is dynamically adjustable according to system delay as measured by time reported by return message packets or acknowledge packets. Audio playback is slowed or accelerated in order to shrink or grow the difference in time between the sender and receiver.

Additional media types, such as file text or screen documents may be added to the block diagrams of FIGS. 12 and 13 as additional inputs to the Write function of stream 114 in FIG. 12 and additional outputs of stream 214 in FIG. 13. In sharing collaborative documents, one member of the conference may be running the application such as a word processor or spreadsheet, and the others viewing a screen only. Alternatively, one member of the conference may be running the application, but the keystrokes of the others are transmitted back to the one member as text data. In such manner, conference members may each have direct input into the collaborative application.

As indicated, the preferred embodiment of the present invention is in software running on a Macintosh computer. A software embodiment has the advantage of being hardware independent, capable of working with any available media source, and across any available communication system. In addition, CPacketStream tasks and methods are shared by various connection streams and media streams. It is noteworthy that the present system achieves multimedia conferencing in a uniprocessor architecture.

Alternative embodiments of the present multimedia communication system include multi-processor architectures where the multi-tasking of received multimedia data packets may be replaced by parallel processing, or in special purpose hardware. In dedicated hardware, each CPacketStream could be a special purpose microprogrammed integrated circuit, where one chip would be required for each media type, and for each connection.

FIGS. 14 through 18 illustrate the various capabilities of the present system of multiple media digital communication. FIG. 14 illustrates a standard video call of the type shown in FIG. 2 over an ethernet network of the type illustrated. FIG. 15 illustrates a video call with collaborative data over an ethernet network of the type illustrated on the screen in FIG. 3. This configuration is contemplated as the most common type of multimedia call.

FIG. 16 illustrates a one way video/audio call with collaborative data over an ethernet network. The data is one way because first party did not answer, but that party was configured to accept messages. The received data is recorded in memory or on disk and played back later, thus creating a multimedia message answering machine. In the message record mode, system delays are not limiting because the message does not have to be recorded in real time; the only requirement is to play it back in real time. The message is recorded on one machine, and sent as a complete message file to the other machine, and there stored on the drive.

Figure 17:
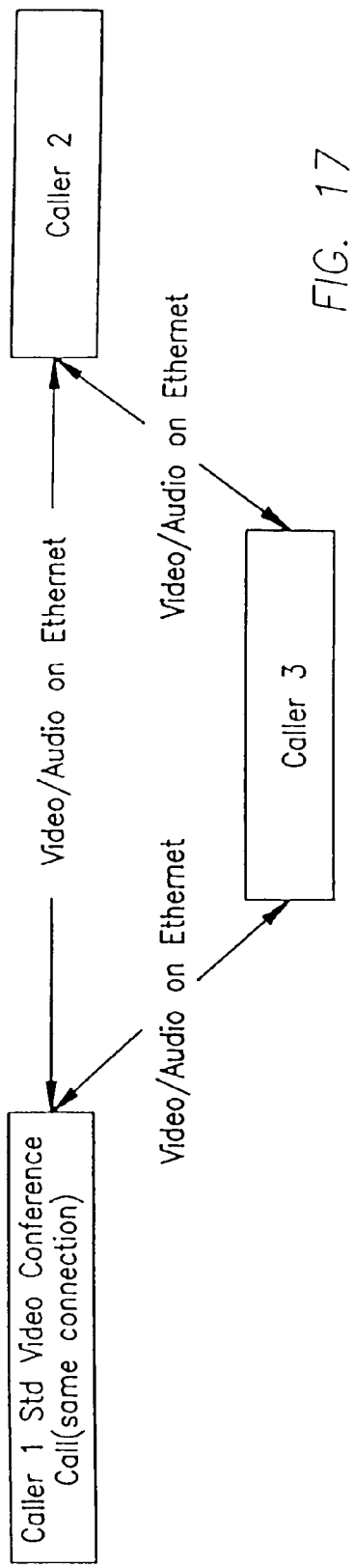
FIG. 17 is a three caller multimedia conference call in a system in accordance with the present invention.

A three way videoconference call is illustrated in FIG. 17. Caller 1, caller 2 and caller 3 are connected over an ethernet communication system. Each caller broadcasts multimedia digital packets to the other two callers. The connection may be expanded to more than three callers. Each caller will see a video image of all the other conferences on their screen in separate windows, as well as hear the conversation and view collaborative data.

Figure 18:
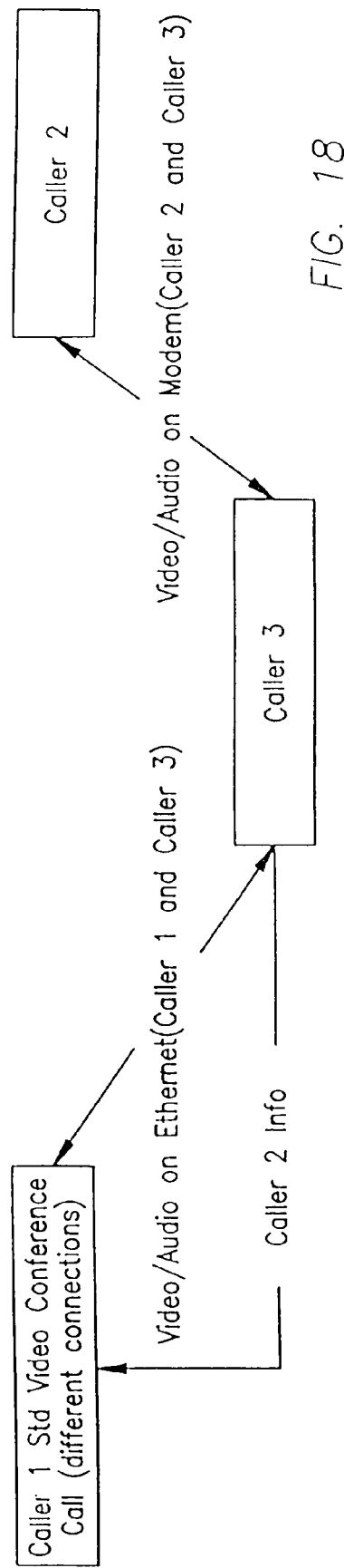
FIG. 18 is an alternate embodiment of a three caller multimedia conference call in a system using both ethernet and a telephone modem in accordance with the present invention.

An alternate embodiment for a three way videoconference call is illustrated in FIG. 18. Two callers (1 and 3) are on ethernet. Another caller, 2 is connected by modem. Caller 3 links caller 1 to caller 2. To link callers 1 and 2, caller 3 rebroadcasts received data packets from caller 1 over ethernet, to caller 2 over modem, and vice versa.

What is claimed is:

1. In a communications network adapted for communication between a first caller and a second caller, an apparatus comprising:
   a first interface to a first communication medium, said first communication medium coupling said first caller to said apparatus via said first interface;
   a second interface to a second communication medium, said second communication medium coupling said apparatus to said second caller via said second interface;
   at least one connection routine adapted to cause control signals to be sent to at least one of said first and second callers to enable media type selections, at least one of said media type selections including a selection of at least two different media types; and
   a packet handling routine adapted to transmit a plurality of digital media packets corresponding to each of said at least two different media types;
   wherein, for at least one of said at least two different media types, at least a portion of said plurality of corresponding digital media packets are transmitted to at least one of said first and second callers in accordance with said media type selections via said first interface and packet handling routine, over one or more packet switched communication channels,
   wherein for at least one of said at least two different media types, the apparatus causes media signals to be communicated between the first and second callers, and
   wherein one of the first and second communication mediums comprises a packet switched network, and the other of the first and second communication mediums comprises a non-packet switched network.

2. The apparatus of claim 1, wherein said one or more packet switched communication channels provide indeterminate system delays and bandwidth limitations that give rise to indeterminate packet loss.

3. The apparatus of claim 1, wherein said media signals communicated between said first and second callers are communicated between the packet switched network and a telephonic network.

4. The apparatus of claim 1, wherein said apparatus is further adapted to assign a priority to each of said digital media packets, said digital media packets being transmitted from said apparatus in substantially the order of said assigned priorities.

5. The apparatus of claim 4, wherein said apparatus further comprises a queue for holding said digital media packets prior to transmission, and said transmission of said digital media packets in substantially the order of said assigned priorities further comprises:
   placing successive ones of said digital media packets in said queue in order of said assigned priorities; and
   transmitting a first digital media packet of said queue.

6. The apparatus of claim 1, wherein said digital media packets include video packets and audio packets.

7. The apparatus of claim 1, wherein said digital media packets include video packets, audio packets, and collaborative data packets.

8. The apparatus of claim 7, wherein said video packets are assigned a lower priority than said audio packets.

9. The apparatus of claim 7, wherein said collaborative data packets are assigned a lower priority than said video packets.

10. The apparatus of claim 1, wherein said media type selections are bidirectional media type selections.

11. The apparatus of claim 1, wherein said media type selection for said first caller is the same as said media type selection for said second caller.

12. The apparatus of claim 1, wherein said media type selection for said first caller is different than said media type selection for said second caller.

13. The apparatus of claim 1, wherein said second communication medium comprises a telephone line, and said second caller is coupled to the telephone line via a first modem.

14. The apparatus of claim 13, wherein said second interface comprises at least a second modem, and communicating said media signals between said first and second callers comprises transmitting packets received from the first communication medium to the second caller by transmitting from the second modem to the first modem.

15. The apparatus of claim 1, wherein said control signals comprise one or more messages sent from one or more connection routines at said apparatus to respective connection routines of the first and second callers.

16. The apparatus of claim 1, wherein said media type selections involve user interaction.

17. The apparatus of claim 1, wherein said first interface comprises a software routine, and said second interface comprises a circuit-switched signal interface.

18. An apparatus for use in a telecommunications network, said apparatus comprising a computer readable medium having at least one computer program stored at least partly thereon, said at least one program being adapted to:
   place into teleconferencing communication one or more of a plurality of remote processing machines that are in signal communication with said apparatus via a packet switched network, and a telephony device coupled to the apparatus at least partially via a telephone line;
   transmit each of a plurality of packets to at least one of said plurality of remote processing machines over said packet switched network via one or more packet switched communication channels, said one or more packet switched communication channels having indeterminate system delays and bandwidth limitations that give rise to indeterminate packet loss, wherein each of said packets has a plurality of data fields associated therewith, at least one of said data fields comprising at least one destination address associated with a respective one of said plurality of remote processing machines; and
   send signals of at least one media type via a telephone network to couple said telephony device into communication with said one or more of said plurality of remote processing machines;
   wherein in at least one supported mode of communication, a first number of said plurality of packets is transmitted for delivery to a first subset of said plurality of remote processing machines while a second number of said plurality of packets is transmitted for delivery to a second subset of said plurality of remote processing machines, said first and second subsets not being identical.

19. The apparatus of claim 18, wherein said computer readable medium comprises a storage device associated with a computerized device.

20. The apparatus of claim 19, wherein said computerized device comprises a gateway apparatus.

21. The apparatus of claim 18, wherein said apparatus is further adapted to:
   receive from at least one source of media data a plurality of media data; and format the plurality of media data to produce the plurality of packets.

22. The apparatus of claim 21, wherein the formatting comprises processing the plurality of media data to produce the plurality of packets.

23. The apparatus of claim 18, wherein said first subset comprises all of said one or more of the plurality of remote processing machines, and said second subset comprises a lesser number thereof.

24. The apparatus of claim 18, wherein said first subset comprises all of said one or more of the plurality of remote processing machines, and said second subset comprises a lesser number thereof, said first number of said plurality of packets involves audio packets and said second number of said plurality of said packets involves video packets.

25. The apparatus of claim 18, wherein the first subset involves remote processing machines which have negotiated the use of a first media type and the second subset involves remote processing machines which have negotiated the use of the first media type and a second media type.

26. The apparatus of claim 25, wherein the first media type corresponds to an audio media type, and the second media type corresponds to a video media type.

27. The apparatus of claim 25, wherein the first media type corresponds to an audio media type, and the second media type corresponds to a collaborative data media type.

28. The apparatus of claim 18, wherein said apparatus is further adapted to generate, for each of said plurality of packets, a count of the number of said plurality of remote processing machines to which said packet was delivered, but not received.

29. In a communications network adapted for communication with a first user machine and a second user machine, an apparatus comprising:
 first and second interfaces to first and second communication mediums, respectively, said first and second communication mediums being in communication with said first and second user machines, respectively;
 at least one connection routine adapted to cause control signals to be sent to at least one of said first and second user machines to enable media type selections, at least one of said media selections including a selection of at least two different media types; and
 a packet routine cooperative with at least one of said first and second interfaces to transmit a plurality of digital media packets corresponding to each of said at least two different media types;
 wherein, for at least one of said at least two different media types, at least a portion of said plurality of corresponding digital media packets are transmitted to at least one of said first and second user machines in accordance with said media type selections over one or more packet switched communication channels; and
 wherein for at least one of said at least two different media types, the apparatus causes media information to be communicated between said first and second user machines,
 wherein the first communication medium comprises a packet switched network, and the second communication medium comprises a non-packet switched network.

30. The apparatus of claim 29, wherein the first communication medium comprises a packet switched network protocol interface and the second communication medium comprises a switched telephony path.

31. The apparatus of claim 29, wherein the first communication medium comprises a packet switched network protocol interface and the second communication medium comprises a telephone line.

32. The apparatus of claim 29, wherein the first communication medium comprises a packet switched network protocol interface and the second communication medium comprises a modem transmission path.

33. The apparatus of claim 32, wherein the modem transmission path comprises a telephone line having at least one wireline path.

34. The apparatus of claim 29, wherein the one or more packet switched communication channels provide indeterminate system delays and bandwidth limitations that give rise to indeterminate packet loss.

35. In a communications network where an apparatus is in communication with a first user machine over a packet switched network, and in communication with a second user machine via a non-packet switched network, said apparatus comprising:
 a processor;
 a first interface adapted for communication via the packet switched network; and
 a second interface adapted for communication via the non-packet switched network;
 wherein said apparatus is adapted to:
 invoke at least one connection routine to cause control signals to be sent to said first and second user machines to enable a media type selection of at least two different media types for at least one of said user machines; and
 generate a plurality of digital media packets corresponding to each of said at least two different media types;
 wherein for at least one of said at least two different media types, said apparatus causes to be transmitted at least a portion of said plurality of corresponding digital media packets to at least said first user machine in accordance with said media type selection, said digital media packets being transmitted over said packet switched network via one or more packet switched communication channels having an indeterminate packet loss; and
 wherein for each of said at least two different media types, the apparatus causes media signals to be communicated between said first and second user machines;
 whereby said first and second user machines can engage in a teleconference bridged between the packet switched network and the non-packet switched network.

36. The apparatus of claim 35, wherein said at least one connection routine comprises at least one routine running substantially on said processor.

37. The apparatus of claim 35, wherein said control signals comprise control messages having a predetermined format.

38. The apparatus of claim 35, wherein said non-packet switched network comprises a telephone network having at least a telephone line.

39. The apparatus of claim 35, wherein said non-packet switched network comprises at least a telephone line.

40. The apparatus of claim 35, wherein said non-packet switched network comprises at least a communication medium that couples into signal communication an endpoint telephony device.

41. An apparatus adapted to communicate with a first caller over a packet switched network, communicate via a telephone network with a second caller, and to relay communication signals between the first and second callers to enable communication therebetween, said apparatus comprising:
   at least one processor;
   at least one connection routine running on said at least one processor, said at least one connection routine being operative to negotiate with a remote processing machine associated with said first caller, a selection of at least one media type from a plurality of media types including audio, video and data, and to configure according to said selection at least one media routine operative to process media data packets received from or to be transmitted to said remote processing machine over said packet switched network via one or more packet switched communication channels; and
   a signal interface to enable connection to the telephone network;
   wherein a number of media types that said apparatus is capable of processing and a number of media types that said remote processing machine selects may be the same or different, and wherein the apparatus communicates with said remote processing machine indicating an available set of media types, and receives from said remote processing machine an indication of the selection;
   wherein the apparatus passes information between said first caller and said second caller to enable said first and second callers to communicate; and
   wherein the telephone network is a non-packet switched network.

42. The apparatus of claim 41, wherein said communication between said apparatus and said remote processing machine comprises a first message issued from said apparatus, and said indication comprises a second selection message.

43. The apparatus of claim 41, wherein the second caller is coupled to the telephone network via a first modem.

44. The apparatus of claim 43, further comprising:
   a second modem; and
   wherein said passing comprises transmitting packets received from the packet switched network to the second caller using the second modem.

45. The apparatus of claim 41, further comprising:
   at least a second connection routine running on said at least one processor, said at least one second connection routine being operative to negotiate with a second remote processing machine associated with said second caller a selection of at least one media type from a plurality of media types including audio, video and data, and to configure according to said selection, at least one media routine running on said at least one processor to process media data packets received from or to be transmitted to said second remote processing machine over said telephone network using a modem connection.

46. Network apparatus adapted to couple into communication a remote processing machine and a telephonic device, the telephonic device being in at least signal communication with said apparatus, comprising:
   a processor; and
   a routine running on said processor for negotiating with the remote processing machine a selection of at least one media type using a media type selection protocol that supports the description of a plurality of media types including audio, video and data, and to configure, according to said selection, the apparatus to process media data packets received from and to be transmitted to said remote processing machine over a packet switched network;
   wherein said selection is of only audio, and
   wherein the telephonic device is in signal communication with said apparatus via a non-packet switched network.

47. Apparatus adapted to communicate with a first caller via a packet switched network, communicate with a second caller at least via a telephone line, and to communicate signals between the first and second callers, the apparatus comprising a processor and at least one routine running thereon, said at least one routine being adapted to:
   negotiate with a remote processing machine a selection of at least one media type from a plurality of media types including audio, video and data, and to configure, according to said selection, said apparatus to process media data packets received from and to be transmitted to said remote processing machine over said packet switched network via one or more packet switched communication channels; and
   place said second caller into signal communication with the apparatus at least via the telephone line;
   wherein said selection is of only audio, and said negotiation comprises sending a first message and receiving a response message, said negotiation involving a message format that supports the description of the audio, video and data media types, wherein the first message indicates that only audio is being offered in the negotiation; and
   wherein the apparatus communicates information between said remote processing machine and said telephone line, and
   wherein the telephone line transmits and receives data in a non-packet switched manner.

48. The apparatus of claim 47, wherein said one or more packet switched communication channels has indeterminate packet loss, and wherein said indeterminate packet loss is at least in part a consequence of indeterminate system delays and bandwidth limitations of said packet switched communication channels.

49. The apparatus of claim 47, wherein said apparatus is further adapted to assign a priority to each of said media data packets and transmit them from said apparatus in substantially the order of said assigned priorities.

50. The apparatus of claim 49, wherein said apparatus further comprises a queue for holding said media data packets prior to transmission, and said transmission of said media data packets in substantially the order of said assigned priorities further comprises:
   placing successive ones of said media data packets in said queue in order of said assigned priorities; and
   transmitting a first media data packet of said queue.

51. The apparatus of claim 47, wherein said selection is a bidirectional media type selection.

52. The apparatus of claim 47, wherein said second caller is coupled to the telephone line via a first modem.

53. The apparatus of claim 52, further comprising a second modem, and said communication of information comprises transmitting media data packets received at the apparatus from the packet switched network by transmitting media data packets from the second modem to the first modem.

54. The apparatus of claim 47, wherein said negotiation comprises sending messages from one or more connection routines at the apparatus to a connection routine of the remote processing machine.

55. The apparatus of claim 47, wherein said remote processing machine is associated with the first caller.

56. The apparatus of claim 47, wherein said remote processing machine is coupled to said first caller via a second telephone line.

57. An apparatus adapted to pass communication signals between a first user device connected to a packet switched network and a second user device connected to a telephone network, said apparatus comprising:
   at least one processor;
   at least one connection routine running on said at least one processor, said at least one connection routine being operative to negotiate with said first user device a selection of at least one media type using a media type selection protocol that supports the description of a plurality of media types including audio, video and data, and to configure, according to said selection, at least one media routine running on said at least one processor to process media data packets received from and to be transmitted to said first user device over said packet switched network via one or more packet switched communication channels; and
   an interface adapted to operatively connect to the telephone network used to communicate with the second user device;
   wherein said selection is of only audio, and said negotiation comprises sending a first message and receiving a response message;
   wherein the apparatus passes information directly or indirectly between said first and second user devices; and
   wherein the telephone network is a non-packet switched network.

58. The apparatus according to claim 57, wherein the telephone network comprises at least a telephone line, and wherein the second caller is coupled to the telephone line via a first modem.

59. The apparatus according to claim 58, further comprising:
   a second modem; and
   wherein the passing comprises passing media data packets received from the packet switched network using said first and second modems.

60. The apparatus according to claim 57, further comprising:
   at least a second connection routine running on said at least one processor, said at least second connection routine being operative to negotiate with said second user device a selection of at least one media type from a plurality of media types including audio, video and data, and to configure according to said selection, at least one media routine running on said at least one processor to process media data packets received from and to be transmitted to said second user device over a telephone line using a modem connection.

61. The apparatus of claim 57, wherein said one or more packet switched communication channels provide indeterminate delays and packet loss.

62. Network apparatus adapted to interface between a first user device connected to a first network and a second user device connected to a second network, said apparatus comprising:
   at least one processor;
   at least one connection routine running on said at least one processor, said at least one connection routine being operative to:
   negotiate with said first user device via a plurality of messages a selection of only audio using a media type selection protocol that supports the description of a plurality of media types including audio, video and data; and
   configure, according to said selection, at least one media routine running on said at least one processor to process media data packets received from and to be transmitted to said first user device over a packet switched network via one or more packet switched communication channels;
   a first interface adapted to operatively connect to the first network; and
   a second interface adapted to operatively connect to the second network;
   wherein the apparatus passes information between said first and second user devices; and
   wherein the first network comprises said packet switched network and the second network comprises a non-packet switched network.

63. The apparatus of claim 62, wherein said second network comprises a telephone network having at least a telephone line.

64. The apparatus of claim 62, wherein said one or more packet switched communication channels provide indeterminate packet loss.

65. Network apparatus adapted to interface between a first apparatus connected to a first transmission means and a second apparatus connected to a second transmission means, said network apparatus comprising:
   means for negotiating with said first apparatus via a plurality of messages a selection of only audio using a media type selection protocol that supports the description of a plurality of media types including audio, video and data;
   means for processing media data packets received from and to be transmitted to said first apparatus over said first transmission means via one or more packet switched communication channels;
   means for configuring said means for processing in accordance with said selection; and
   an interface adapted to operatively connect to the second transmission means;
   wherein the network apparatus passes information between said first and second apparatus; and
   wherein the first transmission means comprises a packet switched network and the second transmission means comprises a non-packet switched network.

66. Network apparatus adapted to couple into communication a remote processing machine and a telephonic device, the telephonic device being in at least signal communication with said apparatus, comprising:
   processor means; and
   means, running at least partly on said processor means, for negotiating with the remote processing machine a selection of at least one media type using a media type selection protocol that supports the description of a plurality of media types including audio, video and data, and to configure, according to said selection, the network apparatus to process media data packets received from and to be transmitted to said remote processing machine over a packet switched network;
   wherein said selection is of only audio, and wherein the telephonic device is in signal communication with said apparatus via a non-packet switched network.

67. Network apparatus adapted to couple into communication a remote processing machine and a telephonic device, the telephonic device being in at least signal communication with said apparatus, comprising:
  a processor; and
  a routine running on said processor for negotiating with the remote processing machine a selection of at least one media type from a plurality of media types including audio, video and data, and to configure, according to said selection, the apparatus to process media data packets received from and to be transmitted to said remote processing machine over a packet switched network;
  wherein said selection is of only audio, and said negotiation comprises a message format that supports the description of the audio, video and data media types, and
  wherein the telephonic device is in signal communication with said apparatus via a non-packet switched network.

68. In a communications network adapted for communication between a first caller and a second caller and a third caller, an apparatus comprising:
  a first interface to a first communication medium, said first communication medium coupling said first caller to said apparatus via said first interface;
  a second interface to a second communication medium, said second communication medium coupling said apparatus to said second caller via said second interface;
  a third interface to a third communication medium, said third communication medium coupling said apparatus to said third caller via said third interface;
  at least one connection routine adapted to cause control signals to be sent to at least one of said first and second and third callers to enable media type selections, at least one of said media type selections including a selection of at least two different media types; and
  a packet handling routine adapted to transmit a plurality of digital media packets corresponding to each of said at least two different media types;
  wherein, for at least one of said at least two different media types, at least a portion of said plurality of corresponding digital media packets are transmitted to at least one of said first and second and third callers in accordance with said media type selections via said first interface and said packet handling routine, over one or more packet switched communication channels;
  wherein for at least one of said at least two different media types, the apparatus causes media signals to be communicated among the first and second and third callers, and
  wherein in at least one supported mode of communication, a first number of said plurality of digital media packets is transmitted for delivery between said first and second callers while a second number of said plurality of digital media packets is transmitted for delivery between said first and third callers, said first and second numbers not being identical.

69. The apparatus as claimed in claim 68, wherein said digital media packets include video packets, audio packets, and collaborative data packets.

70. The apparatus as claimed in claim 68, wherein at least one of said media type selections is performed by either a user or by a routine running on a machine used by said user.

71. The apparatus as claimed in claim 68, wherein said one or more packet switched communication channels provide indeterminate system delays and bandwidth limitations that give rise to indeterminate packet loss.

72. In a communications network adapted for communication with n user machines, n being a positive integer greater than or equal to three, an apparatus comprising:
  n interfaces to n communication mediums, respectively, said n communication mediums being in communication with said n user machines, respectively;
  at least one connection routine adapted to cause control signals to be sent to at least one of said n user machines to enable media type selections, at least one of said selections including a selection of at least two different media types; and
  a packet routine cooperative with at least one of said n interfaces to transmit a plurality of digital media packets corresponding to each of said at least two different media types;
  wherein, for at least one of said at least two different media types, at least a portion of said plurality of corresponding digital media packets are transmitted to at least one of said n user machines in accordance with said media type selections over one or more packet switched communication channels; and
  wherein in at least one supported mode of communication, a first number of said plurality of packets is transmitted for delivery to a first subset of said n user machines while a second number of said plurality of packets is transmitted for delivery to a second subset of said n user machines, said first and second subsets not being identical.

73. The apparatus as claimed in claim 72, wherein said digital media packets include video packets, audio packets, and collaborative data packets.

74. The apparatus as claimed in claim 72, wherein at least one of said media type selections is performed by either a user or by a routine running on at least one of said n user machines.

75. The apparatus as claimed in claim 72, wherein said one or more packet switched communication channels provide indeterminate system delays and bandwidth limitations that give rise to indeterminate packet loss.

76. An apparatus adapted to pass communication signals among a first user device connected to a packet switched network, a second user device connected to a second network, and a third user device connected to a third network, said apparatus comprising:
  at least one processor;
  at least one connection routine running on said at least one processor, said at least one connection routine being operative to negotiate with said first user device a selection of at least one media type using a media type selection protocol that supports the description of a plurality of media types including audio, video and data, and to configure, according to said selection, at least one media routine running on said at least one processor to process media data packets received from and to be transmitted to said first user device over said packet switched network via one or more packet switched communication channels, said one or more packet switched communication channels including a single connection stream that includes packets of at least one media stream set up for each of said at least one media type by said first and second callers; and at least one interface adapted to operatively connect to the second and third networks used to communicate with the second and third user devices; and wherein in at least one supported mode of communication, a first number of said media data packets is transmitted for delivery from said first user device to said second user device while a second number of said media data packets is transmitted for delivery, from said first user device to said third user device, wherein said first and second numbers may not be identical.

77. The apparatus as claimed in claim 76, wherein said media data packets include video packets, audio packets, and collaborative data packets.

78. The apparatus as claimed in claim 76, wherein said media type selection is performed by either a user or by a routine running on at least one of said first, second or third user devices.

79. The apparatus as claimed in claim 76, wherein said one or more packet switched communication channels provide indeterminate system delays and bandwidth limitations that give rise to indeterminate packet loss.

80. Network apparatus adapted to interface among a first apparatus connected to a first transmission means, a second apparatus connected to a second transmission means, and a third apparatus connected to a third transmission means, said network apparatus comprising:

means for negotiating with said first apparatus via a plurality of messages a selection of only audio using a media type selection protocol that supports the description of a plurality of media types including audio, video and data;

means for processing media data packets received from and to be transmitted to said first apparatus over said first transmission means via one or more packet switched communication channels;

means for configuring said means for processing in accordance with said selection; and an interface adapted to operatively connect to the second transmission means;

wherein the network apparatus passes information among said first, second and third apparatuses; and wherein in at least one supported mode of communication, a first number of said media data packets is transmitted for delivery from said first apparatus to said second apparatus while a second number of said media data packets is transmitted for delivery from said first apparatus to said third apparatus, wherein said first and second numbers may not be identical.

81. The network apparatus as claimed in claim 80, wherein said media data packets include video packets, audio packets, and collaborative data packets.

82. The network apparatus as claimed in claim 80, wherein said selection is performed by either a user or by a routine running on at least one of said first, second or third apparatus.

83. The network apparatus as claimed in claim 80, wherein said one or more packet switched communication channels provide indeterminate system delays and bandwidth limitations that give rise to indeterminate packet loss.

84. Network apparatus adapted to interface among a first apparatus connected to a first transmission means, a second apparatus connected to a second transmission means, and a third apparatus connected to a third transmission means, said network apparatus comprising:

means for negotiating via a plurality of messages a selection of only audio using a media type selection protocol that supports the description of a plurality of media types including audio, video and data;

means for processing media data packets received from and to be transmitted to said first apparatus over said first transmission means via one or more packet switched communication channels;

means for configuring said means for processing in accordance with said selection; and an interface adapted to operatively connect to the second transmission means;

wherein the network apparatus passes information among said first, second and third apparatuses; and wherein in at least one supported mode of communication, a first number of said plurality of media data packets is transmitted for delivery from said first apparatus to said second apparatus while a second number of said plurality of media data packets is transmitted for delivery from said first apparatus to said third apparatus, wherein said first and second numbers may not be identical.

85. The network apparatus as claimed in claim 84, wherein said media data packets include video packets, audio packets, and collaborative data packets.

86. The network apparatus as claimed in claim 84, wherein said selection is performed by either a user or by a routine running on at least one of said first, second and third apparatus.

87. The network apparatus as claimed in claim 84, wherein said one or more packet switched communication channels provide indeterminate system delays and bandwidth limitations that give rise to indeterminate packet loss.

88. In a communications network adapted for communication between a first caller and a second caller, an apparatus comprising:

a first interface to a first communication medium, said first communication medium coupling said first caller to said apparatus via said first interface;

a second interface to a second communication medium, said second communication medium coupling said apparatus to said second caller via said second interface;

at least one connection routine adapted to cause control signals to be sent to at least one of said first and second callers to enable media type selections, at least one of said media type selections including a selection of at least two different media types; and a packet handling routine adapted to transmit a plurality of digital media packets corresponding to each of said at least two different media types;

wherein, for at least one of said at least two different media types, at least a portion of said plurality of corresponding digital media packets are transmitted to at least one of said first and second callers in accordance with said media type selections via said first interface and said packet handling routine, over one or more packet switched communication channels, said one or more packet switched communication channels including a single connection stream that includes packets of at least two media streams set up for each of said at least two different media types by said first and second callers; and wherein for at least one of said at least two different media types, the apparatus causes media signals to be communicated between the first and second callers.

89. The apparatus as claimed in claim 88, wherein said digital media packets include video packets, audio packets, and collaborative data packets.

90. The apparatus as claimed in claim 88, wherein at least one of said media type selections is performed by either a user or by a routine running on a machine used by said user.

91. The apparatus as claimed in claim 88, wherein said one or more packet switched communication channels provide indeterminate system delays and bandwidth limitations that give rise to indeterminate packet loss.

92. An apparatus adapted to communicate with a first caller over a packet switched network, communicate via a telephone network with a second caller, and to relay communication signals between the first and second callers to enable communication therebetween, said apparatus comprising:
- at least one processor;
- at least one connection routine running on said at least one processor, said at least one connection routine being operative to negotiate with a remote processing machine associated with said first caller, a selection of at least one media type from a plurality of media types including audio, video and data, and to configure according to said selection at least one media routine operative to process media data packets received from or to be transmitted to said remote processing machine over said packet switched network via one or more packet switched communication channels, said one or more packet switched communication channels including a single connection stream that includes packets of at least one media stream set up for each of said at least one media type by said first and second callers; and
- a signal interface to enable connection to the telephone network;
- wherein a number of media types that said apparatus is capable of processing and a number of media types that said remote processing machine selects may be the same or different, and wherein the apparatus communicates with the remote processing machine indicating an available set of media types, and receives from the remote processing machine an indication of the selection; and
- wherein the apparatus passes information between said first caller and said second caller to enable said first and second callers to communicate.

93. The apparatus as claimed in claim 92, wherein said media data packets include video packets, audio packets, and collaborative data packets.

94. The apparatus as claimed in claim 92, wherein said media type selection is performed by either a user or by a routine running on a machine used by said user.

95. The apparatus as claimed in claim 92, wherein said one or more packet switched communication channels provide indeterminate system delays and bandwidth limitations that give rise to indeterminate packet loss.

96. Network apparatus adapted to couple into communication a remote processing machine and a telephonic device, the telephonic device being in at least signal communication with said apparatus, comprising:
- a processor; and
- a routine running on said processor for negotiating with the remote processing machine a selection of at least one media type using a media type selection protocol that supports the description of a plurality of media types including audio, video and data, and to configure, according to said selection, the apparatus to process media data packets received from and to be transmitted to said remote processing machine over a packet switched network using one or more communication channels, said one or more communication channels including a single connection stream that includes packets of at least one media stream set up for each of said at least one media type by said remote processing machine and said telephonic device.

97. The network apparatus as claimed in claim 96, wherein said media data packets include video packets, audio packets, and collaborative data packets.

98. The apparatus as claimed in claim 96, wherein said media type selection is performed by either a user or by a routine running on at least one of said remote processing machine and said telephonic device.

99. The apparatus as claimed in claim 96, wherein said one or more communication channels provide indeterminate system delays and bandwidth limitations that give rise to indeterminate packet loss.

100. Apparatus adapted to communicate with a first caller via a packet switched network, communicate with a second caller at least via a telephone line, and to communicate signals between the first and second callers, the apparatus comprising a processor and at least one routine running thereon, said at least one routine being adapted to:
- negotiate with a remote processing machine a selection of at least one media type from a plurality of media types including audio, video and data, and to configure, according to said selection, said apparatus to process media data packets received from and to be transmitted to said remote processing machine over said packet switched network via one or more packet switched communication channels, said one or more packet switched communication channels including a single connection stream that includes packets of at least one media stream set up for each of said at least one media type by said first and second callers; and
- place said second caller into signal communication with the apparatus at least via the telephone line;
- wherein said selection is of only audio, and said negotiation comprises sending a first message and receiving a response message, said negotiation involving a message format that supports the description of the audio, video and data media types, wherein the first message indicates that only audio is being offered in the negotiation; and
- wherein the apparatus communicates information between said remote processing machine and said telephone line.

101. The apparatus as claimed in claim 100, wherein said media data packets include video packets, audio packets, and collaborative data packets.

102. The apparatus as claimed in claim 100, wherein said media type selection is performed by either a user or by a routine running on said remote processing machine.

103. The apparatus as claimed in claim 100, wherein said one or more packet switched communication channels provide indeterminate system delays and bandwidth limitations that give rise to indeterminate packet loss.

104. An apparatus adapted to pass communication signals between a first user device connected to a packet switched network and a second user device connected to a telephone network, said apparatus comprising:
- at least one processor;
- at least one connection routine running on said at least one processor, said at least one connection routine being operative to negotiate with said first user device a selection of at least one media type using a media type selection protocol that supports the description of a plurality of media types including audio, video and data, and to configure, according to said selection, at least one media routine running on said at least one processor to process media data packets received from and to be transmitted to said first user device over said packet switched network via one or more packet switched communication channels, said one or more packet switched communication channels including a single connection stream that includes packets of at least one media stream set up for each of said at least one media type by said first and second callers; and an interface adapted to operatively connect to the telephone network used to communicate with the second user device;

wherein said selection is of only audio, and said negotiation comprises sending a first message and receiving a response message; and wherein the apparatus passes information directly or indirectly between said first and second user devices.

105. The apparatus as claimed in claim 104, wherein said media data packets include video packets, audio packets, and collaborative data packets.

106. The apparatus as claimed in claim 104, wherein said media type selection is performed by either a user or by a routine running on said first or second user devices.

107. The apparatus as claimed in claim 104, wherein said one or more packet switched communication channels provide indeterminate system delays and bandwidth limitations that give rise to indeterminate packet loss.

108. Network apparatus adapted to interface among a first apparatus connected to a first transmission means and a second apparatus connected to a second transmission means, said network apparatus comprising:

means for negotiating with said first apparatus via a plurality of messages a selection of only audio using a media type selection protocol that supports the description of a plurality of media types including audio, video and data;

means for processing media data packets received from and to be transmitted to said first apparatus over said first transmission means via one or more packet switched communication channels, said one or more packet switched communication channels including a single connection stream that includes packets of at least two media streams set up by said first and second apparatuses;

means for configuring said means for processing in accordance with said selection; and an interface adapted to operatively connect to the second transmission means;

wherein the network apparatus passes information between said first and second apparatuses.

109. The network apparatus as claimed in claim 108, wherein said media data packets include video packets, audio packets, and collaborative data packets.

110. The network apparatus as claimed in claim 108, wherein said selection of only audio is performed by either a user or by a routine running on at least one of said first or second apparatus.

111. The network apparatus as claimed in claim 108, wherein said one or more packet switched communication channels provide indeterminate system delays and bandwidth limitations that give rise to indeterminate packet loss.

112. Network apparatus adapted to interface between a first apparatus connected to a first transmission means and a second apparatus connected to a second transmission means, said network apparatus comprising:

means for negotiating via a plurality of messages a selection of only audio using a media type selection protocol that supports the description of a plurality of media types including audio, video and data;

means for processing media data packets received from and to be transmitted to said first apparatus over said first transmission means via one or more packet switched communication channels, said one or more packet switched communication channels including a single connection stream that includes packets of at least two media streams set up for said audio only by said first and second apparatuses;

means for configuring said means for processing in accordance with said selection; and an interface adapted to operatively connect to the second transmission means;

wherein the network apparatus passes information between said first and second apparatus.

113. The network apparatus as claimed in claim 112, wherein said media data packets include video packets, audio packets, and collaborative data packets.

114. The network apparatus as claimed in claim 112, wherein said selection of only audio is performed by either a user or by a routine running on at least one of said first or second apparatus.

115. The network apparatus as claimed in claim 112, wherein said one or more packet switched communication channels provide indeterminate system delays and bandwidth limitations that give rise to indeterminate packet loss.

116. Network apparatus adapted to couple into communication a remote processing machine and a telephonic device, the telephonic device being in at least signal communication with said apparatus, comprising:

processor means; and means, running at least partly on said processor means, for negotiating with the remote processing machine a selection of at least one media type using a media type selection protocol that supports the description of a plurality of media types including audio, video and data, and to configure, according to said selection, the network apparatus to process media data packets received from and to be transmitted to said remote processing machine over a packet switched network via one or more packet switched communication channels, said one or more packet switched communication channels including a single connection stream that includes packets of at least one media stream set up for each of said at least one media type selected by said remote processing machine and said telephonic device;

wherein said selection is of only audio.

117. The network apparatus as claimed in claim 116, wherein said media data packets include video packets, audio packets, and collaborative data packets.

118. The network apparatus as claimed in claim 116, wherein said at least one media type selection is performed by either a user or by a routine running on at least one of said remote processing machine or said telephonic device.

119. The network apparatus as claimed in claim 116, wherein said one or more packet switched communication channels provide indeterminate system delays and bandwidth limitations that give rise to indeterminate packet loss.

120. Network apparatus adapted to couple into communication a remote processing machine and a telephonic device, the telephonic device being in at least signal communication with said apparatus, comprising:

a processor; and a routine running on said processor for negotiating with the remote processing machine a selection of at least one media type from a plurality of media types including audio, video and data, and to configure, according to said selection, the apparatus to process media data packets received from and to be transmitted to said remote processing machine over a packet switched network via one or more packet switched communication channels, said one or more packet switched communication channels including a single connection stream that includes packets of at least one media stream set up for each of said at least one media type selected by said remote processing machine and a telephonic device;

wherein said selection is of only audio, and said negotiation comprises a message format that supports the description of the audio, video and data media types.

121. The network apparatus as claimed in claim 120, wherein said media data packets include video packets, audio packets, and collaborative data packets.

122. The network apparatus as claimed in claim 120, wherein said at least one media type selection is performed by either a user or by a routine running on at least one of said remote processing machine or said telephonic device.

123. The network apparatus as claimed in claim 120, wherein said one or more packet switched communication channels provide indeterminate system delays and bandwidth limitations that give rise to indeterminate packet loss.

124. In a communications network adapted for communication between a first caller and a second caller, an apparatus comprising:

a first interface to a first communication medium, said first communication medium coupling said first caller to said apparatus via said first interface;

a second interface to a second communication medium, said second communication medium coupling said apparatus to said second caller via said second interface;

at least one connection routine adapted to cause control signals to be sent to at least one of said first and second callers to enable media type selections, at least one of said media type selections including a selection of at least two different media types; and a packet handling routine adapted to transmit a plurality of digital media packets corresponding to each of said at least two different media types;

wherein, for at least one of said at least two media types, at least a portion of said plurality of corresponding digital media packets are transmitted to at least one of said first and second callers in accordance with said media type selections via said first interface and packet handling routine over one or more packet switched communication channels; and wherein for at least one of said at least two different media types, the apparatus causes media signals to be communicated between the first and second callers, said apparatus being adapted to assign a priority to each of said digital media packets, and said apparatus further comprising:

a queue for holding said plurality of digital media packets corresponding to each of said at least two different media types prior to transmission, said transmission of said plurality of digital media packets being made in substantially the order of said assigned priorities, and said transmission further comprises:

placing successive ones of said plurality of digital media packets in said queue in order of said assigned priorities; and transmitting a first digital media packet in said queue.

125. The apparatus as claimed in claim 124, wherein said digital media packets include video packets, audio packets, and collaborative data packets.

126. The apparatus as claimed in claim 124, wherein at least one of said media type selections is performed by either a user or by a routine running on a machine used by said user.

127. The apparatus as claimed in claim 124, wherein said one or more packet switched communication channels provide indeterminate system delays and bandwidth limitations that give rise to indeterminate packet loss.

128. In a communications network adapted for communication with n user machines, n being a positive integer greater than or equal to three, an apparatus comprising:

n interfaces to n communication mediums, respectively, said n communication mediums being in communication with said n user machines, respectively;

at least one connection routine adapted to cause control signals to be sent to at least one of said n user machines to enable media type selections, at least one of said selections including a selection of at least two different media types; and a packet routine cooperative with at least one of said n interfaces to transmit a plurality of digital media packets corresponding to each of said at least two different media types;

wherein, for at least one of said at least two different media types, at least a portion of said plurality of corresponding digital media packets are transmitted to at least one of said n user machines in accordance with said media type selections over one or more packet switched communication channels, and wherein said apparatus is adapted to assign a priority to each of said digital media packets, said apparatus further comprising:

a queue for holding said plurality of digital media packets corresponding to each of said at least two different media types prior to transmission, said transmission of said plurality of digital media packets being made in substantially the order of said assigned priorities, said transmission further comprising:

placing successive ones of said digital media packets in said queue in order of said assigned priorities; and transmitting a first digital media packet in said queue.

129. The apparatus as claimed in claim 128, wherein said digital media packets include video packets, audio packets, and collaborative data packets.

130. The apparatus as claimed in claim 128, wherein at least one of said media type selections is performed by either a user or by a routine running on at least one of said n user machines.

131. The apparatus as claimed in claim 128, wherein said one or more packet switched communication channels provide indeterminate system delays and bandwidth limitations that give rise to indeterminate packet loss.

132. An apparatus adapted to pass communication signals among a first user device connected to a packet switched network, a second user device connected to a second network, and a third device connected to a third network, said apparatus comprising:

at least one processor;

at least one connection routine running on said at least one processor, said at least one connection routine being operative to negotiate with said first user device a selection of at least one media type using a media type selection protocol that supports the description of a plurality of media types including audio, video and data, and to configure, according to said selection, at least one media routine running on said at least one processor to process media data packets received from and to be transmitted to said first user device over said packet switched network via one or more packet switched communication channels, said one or more packet switched communication channels including a single connection stream that includes packets of at least one media stream set up for said at least one media type selected; and an interface adapted to operatively connect to the second and third networks used to communicate with the second and third user devices; and wherein said apparatus is adapted to assign a priority to each of said media data packets, said apparatus further comprising:

a queue for holding said media data packets prior to transmission, said transmission of said media data packets being made in substantially the order of said assigned priorities, wherein said transmission further comprises:

placing successive ones of said media data packets in said queue in order of said assigned priorities; and transmitting a first media data packet in said queue.

133. The apparatus as claimed in claim 132, wherein said media data packets include video packets, audio packets, and collaborative data packets.

134. The apparatus as claimed in claim 132, wherein said media type selection is performed by either a user or by a routine running on at least one of said first, second and third user devices.

135. The apparatus as claimed in claim 132, wherein said one or more packet switched communication channels provide indeterminate system delays and bandwidth limitations that give rise to indeterminate packet loss.

136. An apparatus disposed in a telecommunications network, said apparatus comprising a computer readable medium having at least one computer program stored at least partly thereon, said at least one computer program being adapted to:

place into teleconferencing communication one or more of a plurality of remote processing machines that are in signal communication with said apparatus via a packet switched network, and a telephony device coupled to the apparatus at least partially via a telephone line;

transmit each of a plurality of packets to at least one of said plurality of remote processing machines over said packet switched network via one or more packet switched communication channels, wherein each packet of said plurality of packets has a plurality of data fields associated therewith, at least one of said data fields comprising at least one destination address associated with a respective one of said plurality of remote processing machines; and send signals of at least one media type via a telephone network to couple said telephony device into communication with said one or more of said plurality of remote processing machines;

wherein in at least one supported mode of communication, a first number of said plurality of packets is transmitted for delivery to a first subset of said plurality of remote processing machines while a second number of said plurality of packets is transmitted for delivery to a second subset of said plurality of remote processing machines, said first and second subsets not being identical.

137. In a communications network where an apparatus is in communication with a first user machine over a packet switched network, and in communication with a second user machine via a non-packet switched network, said apparatus comprising:

a processor;

a first interface adapted for communication via the packet switched network; and a second interface adapted for communication via the non-packet switched network; wherein said apparatus is adapted to:

invoke at least one connection routine to cause control signals to be sent to said first and second user machines to enable a media type selection of at least two different media types for at least one of said user machines; and generate a plurality of digital media packets corresponding to each of said at least two different media types;

wherein for at least one of said at least two different media types, said apparatus causes to be transmitted at least a portion of said plurality of digital media packets to at least said first user machine in accordance with said media type selection; and wherein for each of said at least two different media types, the apparatus causes media signals to be communicated between the first and second user machines;

whereby the first and second user machines can engage in a teleconference bridged between the packet switched network and the non-packet switched network.

* * * * *

UNITED STATES PATENT AND TRADEMARK OFFICE
CERTIFICATE OF CORRECTION

PATENT NO. : 7,050,425 B2
APPLICATION NO. : 10/874782
DATED : May 23, 2006
INVENTOR(S) : Richter et al.

Page 1 of 1

It is certified that error appears in the above-identified patent and that said Letters Patent is hereby corrected as shown below:

Column 19, Lines 40-44

"at least one connection routine adapted to cause control signals to be sent to at least one of said first and second user machines to enable media type selections, at least one of said media selections including a selection of at least two different media types; and"

Should Read:

--at least one connection routine adapted to cause control signals to be sent to at least one of said first and second user machines to enable media type selections, at least one of said media type selections including a selection of at least two different media types; and--

Signed and Sealed this

Twenty-eighth Day of November, 2006

JON W. DUDAS
*Director of the United States Patent and Trademark Office*